US011251732B2

(12) United States Patent
Kawamura et al.

(10) Patent No.: US 11,251,732 B2
(45) Date of Patent: Feb. 15, 2022

(54) MOTOR CONTROL DEVICE AND MOTOR CONTROL METHOD

(71) Applicants: JTEKT CORPORATION, Osaka (JP); JTEKT EUROPE S.A.S., Irigny (FR)

(72) Inventors: Hiroshi Kawamura, Okazaki (JP); Yuji Fujita, Okazaki (JP); Xavier Palandre, Grézieu-la-Varenne (FR); Tahar Slama, Ecully (FR)

(73) Assignees: JTEKT CORPORATION, Osaka (JP); JTEKT EUROPE S.A.S., Irigny (FR)

( * ) Notice: Subject to any disclaimer, the term of this patent is extended or adjusted under 35 U.S.C. 154(b) by 106 days.

(21) Appl. No.: 16/663,482

(22) Filed: Oct. 25, 2019

(65) Prior Publication Data

US 2020/0136543 A1    Apr. 30, 2020

(30) Foreign Application Priority Data

Oct. 29, 2018   (JP) .............................. JP2018-202878

(51) Int. Cl.
*H02P 25/022* (2016.01)
*H02P 21/20* (2016.01)
(Continued)

(52) U.S. Cl.
CPC ............ *H02P 21/20* (2016.02); *B62D 5/0409* (2013.01); *H02P 6/12* (2013.01); *H02P 6/32* (2016.02)

(58) Field of Classification Search
CPC ......... B62D 5/0463; H02P 1/04; H02P 21/06; H02P 21/20; H02P 21/22; H02P 25/03;
(Continued)

(56) References Cited

U.S. PATENT DOCUMENTS

2016/0329853 A1* 11/2016 Koseki .................... H02P 29/68
2017/0272009 A1*  9/2017 Kawamura ............... B60L 3/12
(Continued)

FOREIGN PATENT DOCUMENTS

EP        3597508 A2    1/2020
JP     2011-195089 A   10/2011

OTHER PUBLICATIONS

Mar. 16, 2020 Extended European Search Report issued in European Patent Application No. 19306389.8.

*Primary Examiner* — Muhammad S Islam
(74) *Attorney, Agent, or Firm* — Oliff PLC

(57) ABSTRACT

A motor control device includes processing circuitry configured to calculate a current command value corresponding to torque that should be generated by a motor, divide the calculated current command value into individual current command values for coil groups, control power feeding to the coil groups independently for each of the coil groups based on a corresponding one of the individual current command values, set, for each one of the coil groups, an upper limit value of a corresponding one of the individual current command values and, when the individual current command value for any one of the coil groups is limited to a value that is smaller than a corresponding one of the upper limit values, supplement an amount limited in the individual current command value by increasing the individual current command value for at least a remaining one of the coil groups.

8 Claims, 10 Drawing Sheets

(51) Int. Cl.
 *H02P 6/32* (2016.01)
 *B62D 5/04* (2006.01)
 *H02P 6/12* (2006.01)

(58) Field of Classification Search
 CPC .... H02P 25/26; H02P 6/08; H02P 6/12; H02P 6/28; H02P 6/32
 See application file for complete search history.

(56) References Cited

U.S. PATENT DOCUMENTS

2017/0349208 A1* 12/2017 Sugawara ............ B62D 5/0463
2018/0237058 A1* 8/2018 Furukawa ............... H02P 29/02

* cited by examiner

MOTOR CONTROL DEVICE AND MOTOR CONTROL METHOD

BACKGROUND

1. Field

The present disclosure relates to a motor control device and a motor control method.

2. Description of Related Art

Japanese Laid-Open Patent Publication No. 2011-195089 describes a typical example of a control device that controls a motor, which is the generator of assist torque given to a steering mechanism for a vehicle. The control device includes two control systems and controls power feeding to the motor, which includes two coil groups respectively corresponding to the two control systems. Each of the two control systems includes a pair of drive circuits and microcomputers. Each microcomputer controls the corresponding drive circuit in accordance with steering torque. Thus, power feeding to the two coil groups is controlled independently for each control system. The motor generates assist torque that is the total torque generated by the two coil groups.

In the motor including the two coil groups, the maximum torque that can be generated by the two coil groups may be unbalanced. Such a situation may be caused by several factors. For example, when one of the two coil groups is overheated, only power feeding to the coil group where overheating is detected is restricted in order to protect that coil group. In this case, only the torque generated by the coil group where the power feeding is restricted reaches an upper limit value. Thus, the ratio of change in the assist torque to the steering torque varies prior to and subsequent to the point in time the torque generated by the coil group where the power feeding is restricted reaches the upper limit value. This variation causes fluctuation in the steering torque or torque ripple. The fluctuation or the torque ripple may be uncomfortable for the driver.

SUMMARY

It is an object of the present disclosure to provide a motor control device and a motor control method that change a total motor torque at a certain ratio even if the maximum torque that can be generated by coil groups is unbalanced.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A motor control device according to one aspect of the present disclosure controls a motor including coil groups. The motor control device includes processing circuitry. The processing circuitry is configured to calculate a current command value corresponding to torque that should be generated by the motor, divide the calculated current command value into individual current command values for the coil groups, and control power feeding to the coil groups independently for each of the coil groups based on a corresponding one of the individual current command values. The processing circuitry is further configured to: set, for each one of the coil groups, an upper limit value of a corresponding one of the individual current command values, and when the individual current command value for any one of the coil groups is limited to a value that is smaller than a corresponding one of the upper limit values, supplement an amount limited in the individual current command value by increasing the individual current command value for at least a remaining one of the coil groups.

A motor control method according to the present disclosure controls a motor including coil groups. The motor control method includes calculating a current command value corresponding to torque that should be generated by the motor, dividing the calculated current command value into individual current command values for the coil groups, controlling power feeding to the coil groups independently for each of the coil groups based on a corresponding one of the individual current command values, setting, for each one of the coil groups, an upper limit value of a corresponding one of the individual current command values, and when the individual current command value for any one of the coil groups is limited to a value that is smaller than a corresponding one of the upper limit values, supplementing an amount limited in the individual current command value by increasing the individual current command value for at least a remaining one of the coil groups.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

First Embodiment

A motor control device applied to an electronic control unit (ECU) of an electric power steering 10 (hereinafter referred to as EPS 10) according to a first embodiment will now be described.

Figure 1:
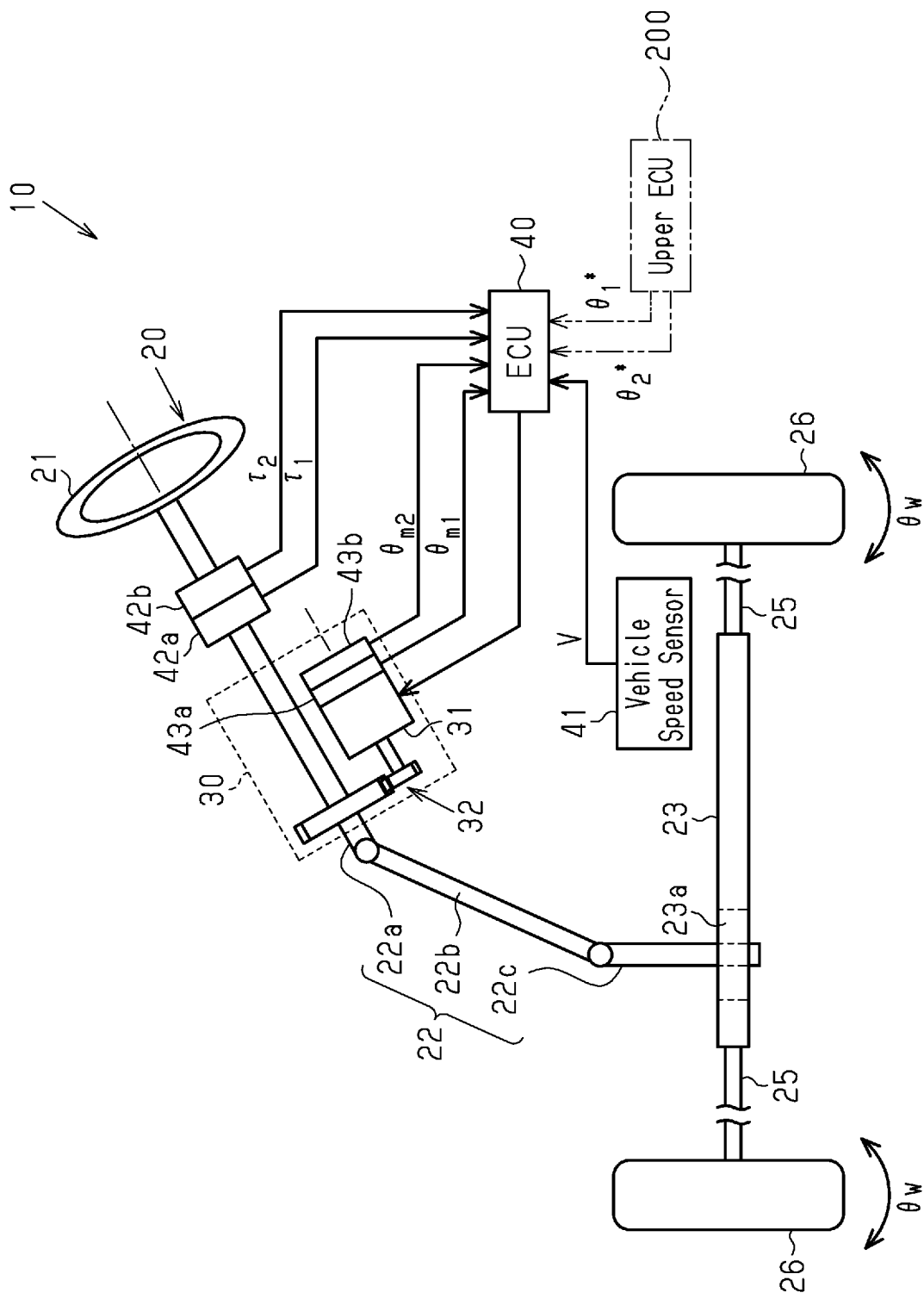
FIG. 1 is a diagram schematically showing an electric power steering equipped with a motor control device according to a first embodiment.

As shown in FIG. 1, the EPS 10 includes a steering mechanism 20, which steers steerable wheels based on a steering operation performed by a driver, a steering assist mechanism 30, which assists the steering operation performed by the driver, and an ECU 40, which is a controller that controls actuation of the steering assist mechanism 30.

The steering mechanism 20 includes a steering wheel 21, which is operated by the driver, and a steering shaft 22, which rotates integrally with the steering wheel 21. The steering shaft 22 includes a column shaft 22a, which is coupled to the steering wheel 21, an intermediate shaft 22b, which is coupled to the lower end of the column shaft 22a, and a pinion shaft 22c, which is coupled to the lower end of the intermediate shaft 22b. The lower end of the pinion shaft 22c is meshed with a rack shaft 23, which extends in a direction intersecting the pinion shaft 22c. More specifically, the lower end of the pinion shaft 22c is meshed with rack teeth 23a of the rack shaft 23. The opposite ends of the rack shaft 23 are respectively coupled to left and right steerable wheels 26.

Thus, the meshing of the pinion shaft 22c and the rack shaft 23 converts rotation of the steering shaft 22 into reciprocation of the rack shaft 23. The reciprocation is transmitted to the left and right steerable wheels 26 to change a steered angle $\theta_w$ of each steerable wheel 26.

The steering assist mechanism 30 includes a motor 31, which is the generator of a steering assist force (i.e., assist torque). The motor 31 is, for example, a three-phase brushless motor. The motor 31 is coupled to the column shaft 22a by a speed reducer 32. The speed reducer 32 decelerates rotation of the motor 31 and transmits the decelerated rotation force to the column shaft 22a. That is, the steering operation performed by the driver is assisted by giving torque of the motor 31 to the steering shaft 22 as a steering assist force.

The ECU 40 obtains detection results of various sensors arranged in the vehicle as information indicating a request of the driver, a traveling state, a steering state and controls the motor 31 based on the obtained information. The ECU 40 may be processing circuitry including: 1) one or more processors that execute various processes according to a computer program (software); 2) one or more dedicated hardware circuits (ASICs) that execute at least part of the various processes, or 3) a combination thereof. The processor includes a CPU and memories such as a RAM and a ROM. The memories store program codes or commands configured to cause the CPU to execute processes. The memories, or computer-readable media, include any type of media that are accessible by general-purpose computers and dedicated computers.

The various sensors include, for example, a vehicle speed sensor 41, torque sensors 42a and 42b, and rotation angle sensors 43a and 43b. The vehicle speed sensor 41 detects a vehicle speed V, which is the travel speed of the vehicle. The torque sensors 42a and 42b are arranged on the column shaft 22a. The torque sensors 42a and 42b respectively detect a steering torque $\tau_1$ and a steering torque $\tau_2$, which are given to the steering shaft 22. The rotation angle sensors 43a and 43b are arranged in the motor 31. The rotation angle sensors 43a and 43b respectively detect rotation angles $\theta_{m1}$ and $\theta_{m2}$ of the motor 31.

The ECU 40 executes vector control of the motor 31 using the rotation angles $\theta_{m1}$ and $\theta_{m2}$ of the motor 31, which are detected by the rotation angle sensors 43a and 43b. Further, the ECU 40 calculates a target assist torque based on the steering torque $\tau_1$ and the steering torque $\tau_2$ and the vehicle speed V and supplies the motor 31 with drive power that causes the calculated target assist torque to be generated by the steering assist mechanism 30.

The configuration of the motor 31 will now be described.

Figure 2:
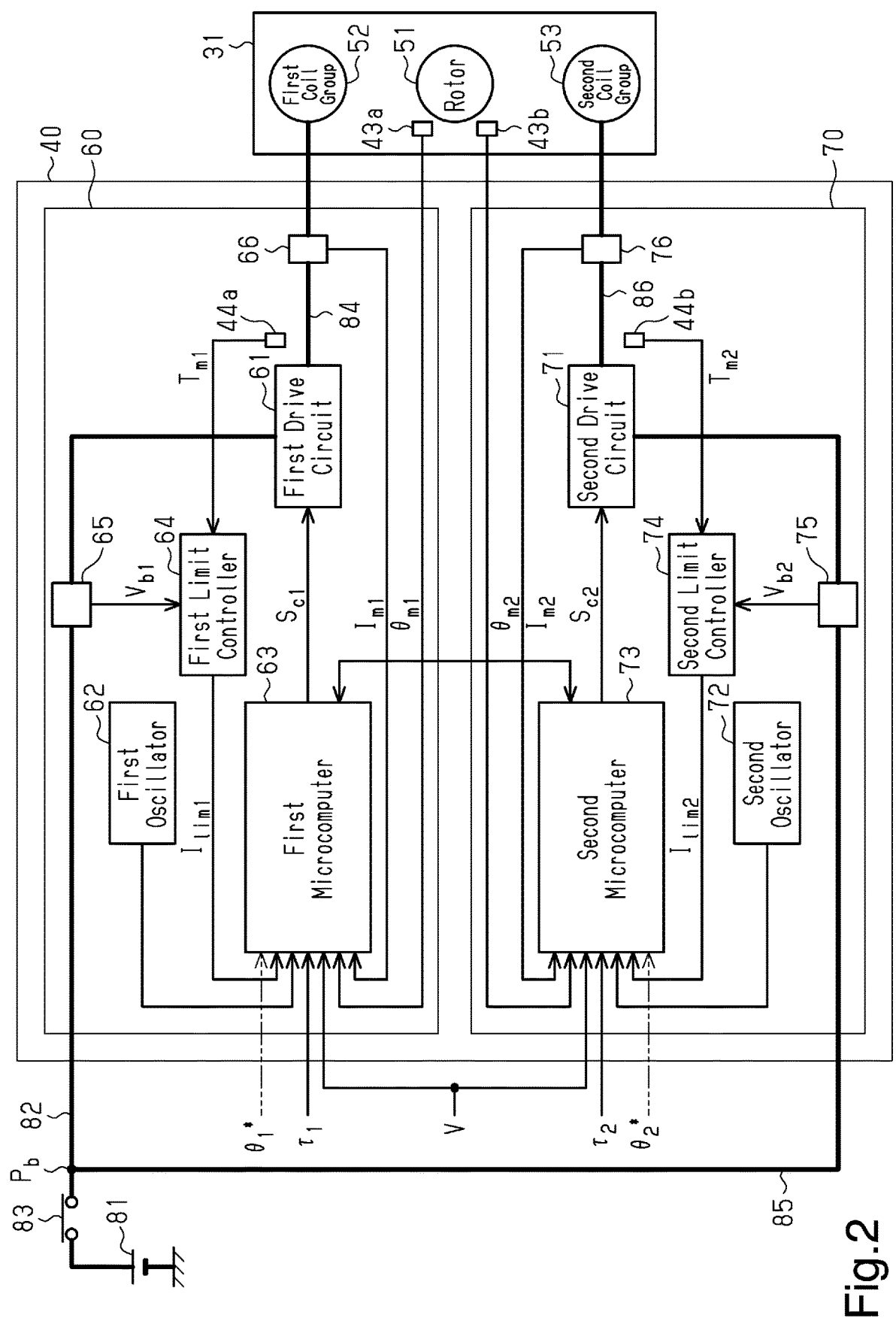
FIG. 2 is a block diagram of the motor control device and the motor shown in FIG. 1.

As shown in FIG. 2, the motor 31 includes a rotor 51, a first coil group 52, and a second coil group 53. The first coil group 52 and the second coil group 53 are wound around a stator (not shown). The first coil group 52 includes a U-phase coil, a V-phase coil, and a W-phase coil. In the same manner, the second coil group 53 includes a U-phase coil, a V-phase coil, and a W-phase coil.

The ECU 40 will now be described in detail.

As shown in FIG. 2, the ECU 40 includes a first control system corresponding to the first coil group 52 and a second control system corresponding to the second coil group 53. The ECU 40 controls power feeding to the first coil group 52 and the second coil group 53 for each control system. The ECU 40 includes the first control system (i.e., a first controller 60 serving as an individual controller), which controls power feeding to the first coil group 52, and the second control system (i.e., a second controller 70 serving as an individual controller), which controls power feeding to the second coil group 53.

The first controller 60 includes a first drive circuit 61, a first oscillator 62, a first microcomputer 63, and a first limit controller 64.

The first drive circuit 61 is supplied with power from a direct-current power supply 81 such as a battery installed in the vehicle. The first drive circuit 61 and a positive terminal of the direct-current power supply 81 are connected to each other by a first power feeding line 82. The first power feeding line 82 includes a power supply switch 83 for the vehicle such as an ignition switch. The power supply switch 83 is switched to activate a travel drive source for the vehicle such as an engine. When the power supply switch 83 is activated, the power of the direct-current power supply 81 is supplied to the first drive circuit 61 via the first power feeding line 82. The first power feeding line 82 includes a voltage sensor 65. The voltage sensor 65 detects voltage $V_{b1}$ at the direct-current power supply 81. The first microcomputer 63 and the rotation angle sensor 43a are supplied with power of the direct-current power supply 81 via a power feeding line (not shown).

The first drive circuit 61 is a PWM inverter including three legs corresponding to the three phases, namely, U-phase, V-phase, and W-phase. The three legs are connected to each other in parallel. Each leg includes two switching elements such as field-effect transistors that are connected to each other in series. The first drive circuit 61 converts direct-current power supplied from the direct-current power supply 81 into three-phase alternating-current power by switching the switching element of each phase based on a command signal $S_{c1}$, which is generated by the first microcomputer 63. The three-phase alternating-current power generated by the first drive circuit 61 is supplied to the first coil group 52 via a power feeding path 84 of each phase, which includes, for example, a bus bar or a cable. The power feeding path 84 includes a current sensor 66. The current sensor 66 detects current $I_{m1}$, which is supplied from the first drive circuit 61 to the first coil group 52.

The first oscillator 62, which is used as a clock generation circuit, generates a clock serving as a synchronous signal used to operate the first microcomputer 63.

The first microcomputer 63 executes various processes in accordance with the clock generated by the first oscillator 62. The first microcomputer 63 uses the steering torque $\tau_1$, which is detected by the torque sensor 42a, and the vehicle speed V, which is detected by the vehicle speed sensor 41, to calculate the target assist torque that should be generated by the motor 31. The first microcomputer 63 calculates a first current command value and a second current command value in accordance with the target assist torque. The first current command value is a target value of current that should be supplied to the first coil group 52. The first current command value corresponds to the torque that should be generated by the first coil group 52 in the total torque that should be generated by the motor 31. The second current command value is a target value of current that should be supplied to the second coil group 53. The second current command value corresponds to the torque that should be generated by the second coil group 53 in the total torque that should be generated by the motor 31.

The first microcomputer 63 generates the command signal $S_{c1}$ for the first drive circuit 61 based on the first current command value. The command signal $S_{c1}$ is a PWM signal that has undergone pulse-width modulation and defines the duty ratio of each switching element of the first drive circuit 61. The duty ratio refers to the ratio of an activation period of the switching element occupying a pulse cycle. The first microcomputer 63 controls energization to the first coil group 52 using the rotation angle $\theta_{m1}$ of the motor 31 (more specifically, the rotation angle $\theta_{m1}$ of the rotor 51), which is detected by the rotation angle sensor 43a. When the current corresponding to the command signal $\theta_{c1}$ is supplied to the first coil group 52 via the first drive circuit 61, the first coil group 52 generates the torque corresponding to the first current command value.

The first limit controller 64 calculates a limit value $I_{lim1}$ to limit the amount of current supplied to the first coil group 52 in accordance with the voltage $V_{b1}$ at the direct-current power supply 81, which is detected by the voltage sensor 65, and a heat-generating state of the motor 31 (more specifically, a heat-generating state of the first coil group 52). The limit value $I_{lim1}$ is set as an upper limit value of the amount of current supplied to the first coil group 52 in order to limit decreases in the voltage $V_{b1}$ at the direct-current power supply 81 or protect the motor 31 from overheating.

When the voltage $V_{b1}$ at the direct-current power supply 81 detected by the voltage sensor 65 is less than or equal to a voltage threshold value, the first limit controller 64 calculates the limit value $I_{lim1}$ in accordance with the value of the present voltage $V_{b1}$. The voltage threshold value is set with reference to the lower limit value of an assist guarantee voltage range of the EPS 10. Further, when a temperature $\tau_{m1}$ of the first coil group 52 or its surroundings detected by a temperature sensor 44a, which is arranged in the proximity of the first limit controller 64 or the power feeding path 84, exceeds a temperature threshold value, the first limit controller 64 calculates the limit value $I_{lim1}$. When the first limit controller 64 calculates the limit value $I_{lim1}$, the first microcomputer 63 limits the amount of current supplied to the first coil group 52 (i.e., the torque generated by the first coil group 52) in accordance with the limit value $I_{lim1}$.

The second controller 70 basically has the same configuration as the first controller 60. That is, the second controller 70 includes a second drive circuit 71, a second oscillator 72, a second microcomputer 73, and a second limit controller 74.

The second drive circuit 71 is supplied with power from the direct-current power supply 81. The first power feeding line 82 includes a connection point $P_b$, which is located between the power supply switch 83 and the first controller 60. The connection point Pb and the second drive circuit 71 are connected to each other by a second power feeding line 85. When the power supply switch 83 is activated, the power of the direct-current power supply 81 is supplied to the second drive circuit 71 via the second power feeding line 85. The second power feeding line 85 includes a voltage sensor 75. The voltage sensor 75 detects voltage $V_{b2}$ at the direct-current power supply 81.

The three-phase alternating-current power generated by the second drive circuit 71 is supplied to the second coil group 53 via a power feeding path 86 of each phase, which includes, for example, a bus bar or a cable. The power feeding path 86 includes a current sensor 76. The current sensor 76 detects current $I_{m2}$, which is supplied from the second drive circuit 71 to the second coil group 53.

The second microcomputer 73 executes various processes in accordance with the clock generated by the second oscillator 72. The second microcomputer 73 uses the steering torque $\tau_2$, which is detected by the torque sensor 42b, and the vehicle speed V, which is detected by the vehicle speed sensor 41, to calculate the target assist torque that should be generated by the motor 31. The second microcomputer 73 calculates the first current command value and the second current command value in accordance with the target assist torque.

The first current command value and the second current command value calculated by the second microcomputer 73 are used for backup. When the first microcomputer 63 is operating normally, the second microcomputer 73 generates a command signal $S_{c2}$ for the second drive circuit 71 based on the second current command value, which is calculated by the first microcomputer 63.

The second microcomputer 73 controls energization to the second coil group 53 using the rotation angle $\theta_{m2}$ of the motor 31 (more specifically, the rotation angle $\theta_{m2}$ of the rotor 51), which is detected by the rotation angle sensor 43b. When the current corresponding to the command signal $S_{c2}$ is supplied to the second coil group 53 via the second drive circuit 71, the second coil group 53 generates the torque corresponding to the second current command value.

The second limit controller 74 calculates a limit value $I_{lim2}$ to limit the amount of current supplied to the second coil group 53 in accordance with the voltage at the direct-current power supply 81, which is detected by the voltage sensor 75, and a temperature $\tau_{m2}$, which indicates a heat-generating state of the motor 31 (more specifically, a heat-generating state of the second coil group 53). The temperature sensor 44b is arranged in the proximity of the second drive circuit 71 or the power feeding path 86. When the second limit controller 74 calculates the limit value $I_{lim2}$, the second microcomputer 73 limits the amount of current supplied to the second coil group 53 (i.e., the torque generated by the second coil group 53) in accordance with the limit value $I_{lim2}$.

The configurations of the first microcomputer 63 and the second microcomputer 73 will now be described in detail.

Figure 3:
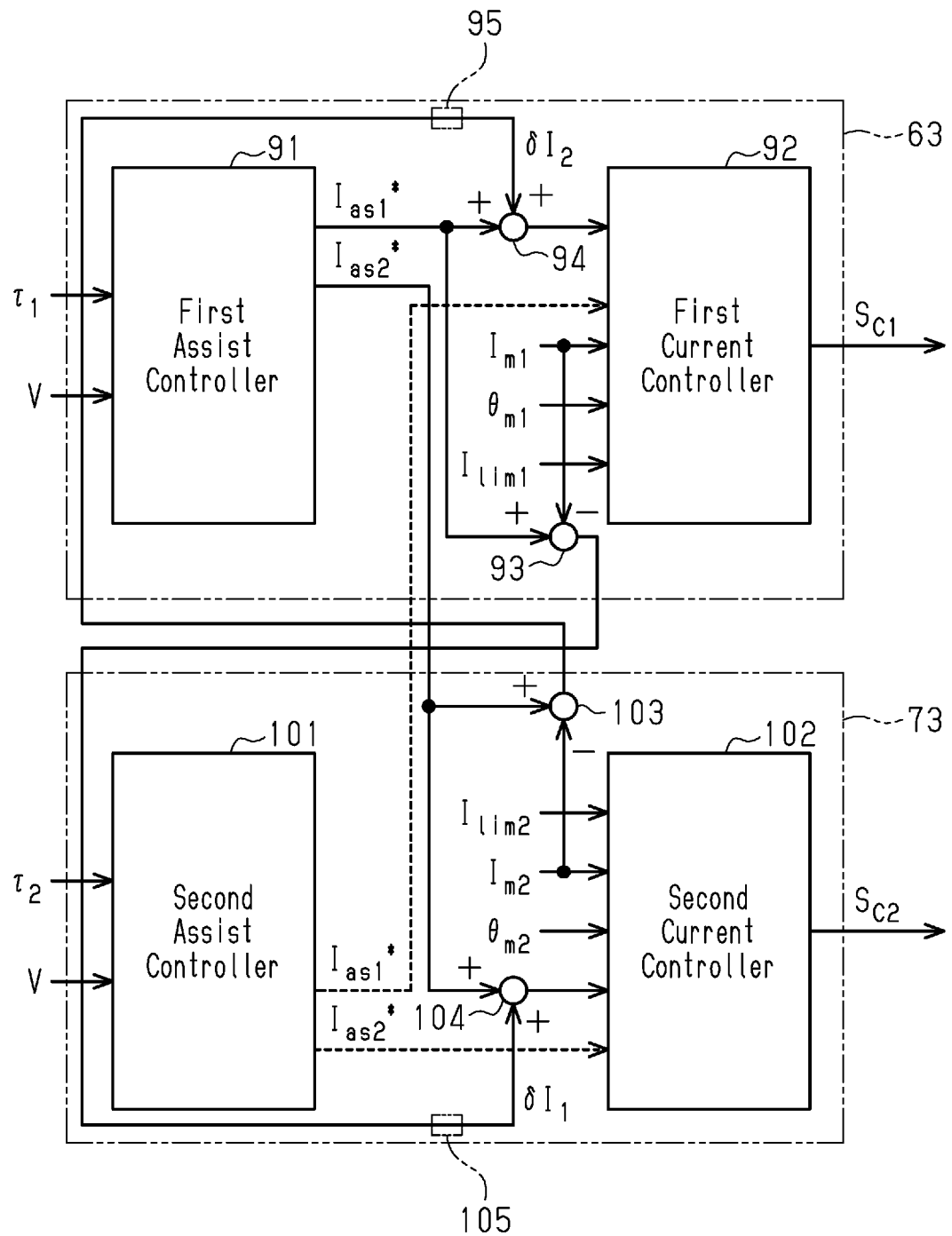
FIG. 3 is a block diagram of the first microcomputer and the second microcomputer of the motor control device shown in FIG. 2.

As shown in FIG. 3, the first microcomputer 63 includes a first assist controller 91 and a first current controller 92.

The first assist controller 91 calculates the target assist torque that should be generated in the motor 31 based on the steering torque $\tau_1$, which is detected by the torque sensor 42a, and the vehicle speed V, which is detected by the vehicle speed sensor 41. Then, the first assist controller 91 calculates the current command value based on the calculated target assist torque. The current command value corresponds to the total amount of current that should be supplied to the motor 31 to generate a target assist torque having a suitable magnitude corresponding to the steering torque $\tau_1$ and the vehicle speed V. As the absolute value of the steering torque $\tau_1$ becomes larger and the vehicle speed V becomes lower, the first assist controller 91 calculates the current command value of a larger absolute value.

The first assist controller 91 uses the total current command value to calculate a first current command value $I_{as1}*$, which is an individual current command value for the first coil group 52, and a second current command value $I_{as2}*$, which is an individual current command value for the second coil group 53. In other words, the first assist controller 91 divides the total current command value into the first current command value $I_{as1}*$ and the second current command value $I_{as2}*$.

The upper limit values of the first current command value $I_{as1}*$ and the second current command value $I_{as2}*$ are set to the same value. The upper limit values of the first current command value $I_{as1}*$ and the second current command value $I_{as2}*$ are respectively set to half (50%) of the maximum value (100%) of the current command value corresponding to the maximum torque that can be generated by the motor 31.

When the current command value corresponding to the target assist torque is less than or equal to the upper limit value of the first current command value $I_{as1}*$, the first assist controller 91 sets the current command value as the first current command value $I_{as1}*$ and sets the second current command value $I_{as2}*$ to 0. Further, when the current command value corresponding to the target assist torque is greater than the upper limit value of the first current command value $I_{as1}*$, the first assist controller 91 sets the current command value of the first current command value $I_{as1}*$ to its upper limit value and sets an amount exceeding the upper limit value of the first current command value $I_{as1}*$ as the second current command value $I_{as2}*$.

The first current controller 92 generates the command signal $S_{c1}$ for the first drive circuit 61 by executing a current feedback control that causes an actual value of the current $I_{m1}$, which is supplied to the first coil group 52, to follow the first current command value $I_{as1}*$. The first current controller 92 controls energization to the first coil group 52 using the rotation angle $\theta_{m1}$ of the motor 31, which is detected by the rotation angle sensor 43a. When the current corresponding to the command signal $S_{c1}$ is supplied to the first coil group 52 via the first drive circuit 61, the first coil group 52 generates the torque corresponding to the first current command value $I_{as1}*$.

When the first limit controller 64 calculates the limit value $L_{lim1}$, the first current controller 92 limits the torque generated by the first coil group 52 in accordance with the calculated limit value $L_{lim1}$. More specifically, the first current controller 92 limits the first current command value $I_{as1}*$, which is calculated by the first assist controller 91, to be smaller than the original value.

The second microcomputer 73 basically has the same configuration as the first microcomputer 63. That is, the second microcomputer 73 includes a second assist controller 101 and a second current controller 102.

The second assist controller 101 calculates the target assist torque that should be generated in the motor 31 based on the steering torque $\tau_2$, which is detected by the torque sensor 42b, and the vehicle speed V, which is detected by the vehicle speed sensor 41. Then, the second assist controller 101 calculates the current command value based on the calculated target assist torque. The second assist controller 101 calculates the first current command value $I_{as1}*$ and the second current command value $I_{as2}*$ for backup based on the total current command value. In other words, the second assist controller 101 divides the total current command value into the first current command value $I_{as1}*$ for backup and the second current command value $I_{as2}{}^*$ for backup in accordance with the current command value.

The second assist controller 101 supplies the first current command value $I_{as1}{}^*$ for backup to the first current controller 92 and supplies the second current command value $I_{as2}{}^*$ for backup to the second current controller 102. When the first microcomputer 63 is operating normally, the first current controller 92 does not use the first current command value $I_{as1}{}^*$ for backup. When the first microcomputer 63 is operating normally, the second current controller 102 does not use the second current command value $I_{as2}{}^*$ for backup.

The second current controller 102 generates the command signal $S_{c2}$ for the second drive circuit 71 by executing a current feedback control that causes an actual value of current $I_{m2}$, which is supplied to the second coil group 53, to follow the second current command value $I_{as1}{}^*$. The second current controller 102 controls energization to the second coil group 53 using the rotation angle $\theta_{m2}$ of the motor 31, which is detected by the rotation angle sensor 43b. When the current corresponding to the command signal $S_{c2}$ is supplied to the second coil group 53 via the second drive circuit 71, the second coil group 53 generates the torque corresponding to the second current command value $I_{as2}{}^*$.

When the second limit controller 74 calculates the limit value $I_{lim2}$, the second current controller 102 limits the torque generated by the second coil group 53 in accordance with the calculated limit value $L_{lim2}$. More specifically, the second current controller 102 limits the second current command value $I_{as2}{}^*$, which is calculated by the second assist controller 101, to be smaller than the original value.

Description will now be made on the ideal relationship between the steering torque $\tau_1$ or $\tau_2$ and the current command value in a normal case in which the current supplied to the first coil group 52 and the current supplied to the second coil group 53 are not limited.

Figure 4A:
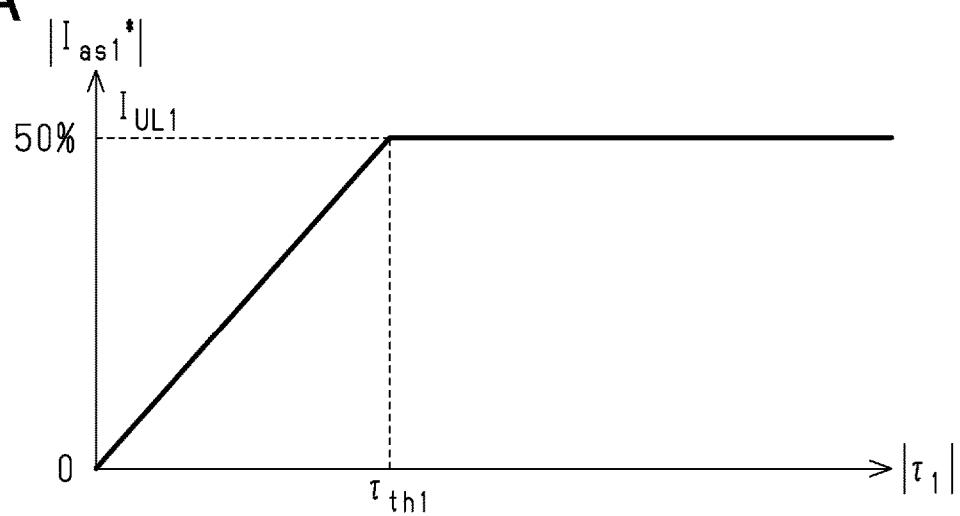
FIG. 4A is a graph illustrating the relationship between a steering torque and a first current command value for the first coil group of the motor shown in FIG. 2 when the motor current for the first coil group is not limited in the first embodiment.

As shown in FIG. 4A, when the steering torque $\tau_1$ is plotted on the horizontal axis and the first current command value $I_{as1}{}^*$ is plotted on the vertical axis, the relationship between the steering torque $\tau_1$ and the first current command value $I_{as1}{}^*$ is as follows. That is, as the absolute value of the steering torque $\tau_1$ increases from 0, the absolute value of the first current command value $I_{as1}{}^*$ increases linearly. When the steering wheel 21 is located at a steering neutral position, the absolute value of the steering torque $\tau_1$ is 0. When the absolute value of the steering torque $\tau_1$ reaches a torque threshold value $\tau_{th1}$, the absolute value of the first current command value $I_{as1}{}^*$ reaches an upper limit value $I_{UL1}$. The absolute value of the upper limit value $I_{UL1}$ of the first current command value $I_{as1}{}^*$ corresponds to half (50%) of the maximum torque that can be generated by the motor 31. After the absolute value of the steering torque $\tau_1$ reaches the torque threshold value $\tau_{th1}$, the absolute value of the first current command value $I_{as1}{}^*$ remains the upper limit value $I_{UL1}$ while the absolute value of the steering torque $\tau_1$ increases.

Figure 4B:
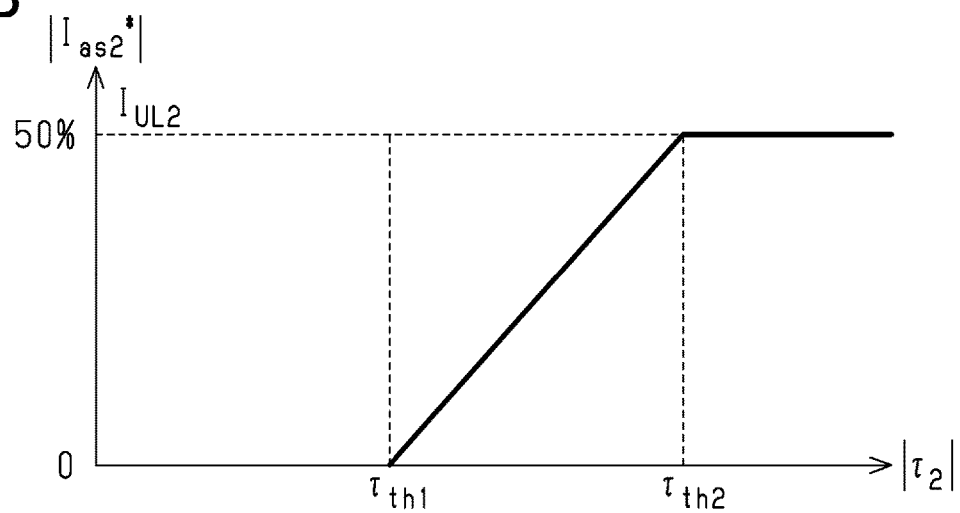
FIG. 4B is a graph illustrating the relationship between the steering torque and a second current command value for the second coil group of the motor shown in FIG. 2 when the motor current for the second coil group is not limited in the first embodiment.

As shown in FIG. 4B, when the steering torque $\tau_2$ is plotted on the horizontal axis and the second current command value $I_{as1}{}^*$ is plotted on the vertical axis, the relationship between the steering torque $\tau_2$ and the second current command value $I_{as1}{}^*$ is as follows. That is, the absolute value of the second current command value $I_{as2}{}^*$ remains 0 regardless of the absolute value of the steering torque $\tau_2$ until the absolute value of the steering torque $\tau_2$ reaches the torque threshold value $\tau_{th1}$ from 0. After the absolute value of the steering torque $\tau_2$ reaches the torque threshold value $\tau_{th1}$, the absolute value of the second current command value $I_{as2}{}^*$ increases linearly as the absolute value of the steering torque $\tau_2$ increases. When the absolute value of the steering torque $\tau_2$ reaches a torque threshold value $\tau_{th2}$ ($>\tau_{th1}$), the absolute value of the second current command value $I_{as2}{}^*$ reaches an upper limit value $I_{UL2}$. The absolute value of the upper limit value $I_{UL2}$ of the second current command value $I_{as1}{}^*$ corresponds to half (50%) of the maximum torque that can be generated by the motor 31. After the absolute value of the steering torque $\tau_2$ reaches the torque threshold value $\tau_{th2}$, the absolute value of the second current command value $I_{as2}{}^*$ remains the upper limit value $I_{UL2}$ while the absolute value of the steering torque $\tau_2$ increases.

The torque threshold value $\tau_{th2}$ is a value two times larger than the torque threshold value $\tau_{th1}$. The ratio of an increase amount of the absolute value of the second current command value $I_{as2}{}^*$ to an increase amount of the absolute value of the steering torque $\tau_2$ when the steering torque $\tau_2$ is a value within a set range ($\tau_{th1}$ to $\tau_{th2}$) is equal to the ratio of an increase amount of the absolute value of the first current command value $I_{as1}{}^*$ to an increase amount of the absolute value of the steering torque $\tau_1$ when the steering torque $\tau_1$ is a value within a set range (0 to $\tau_{th1}$).

Figure 4C:
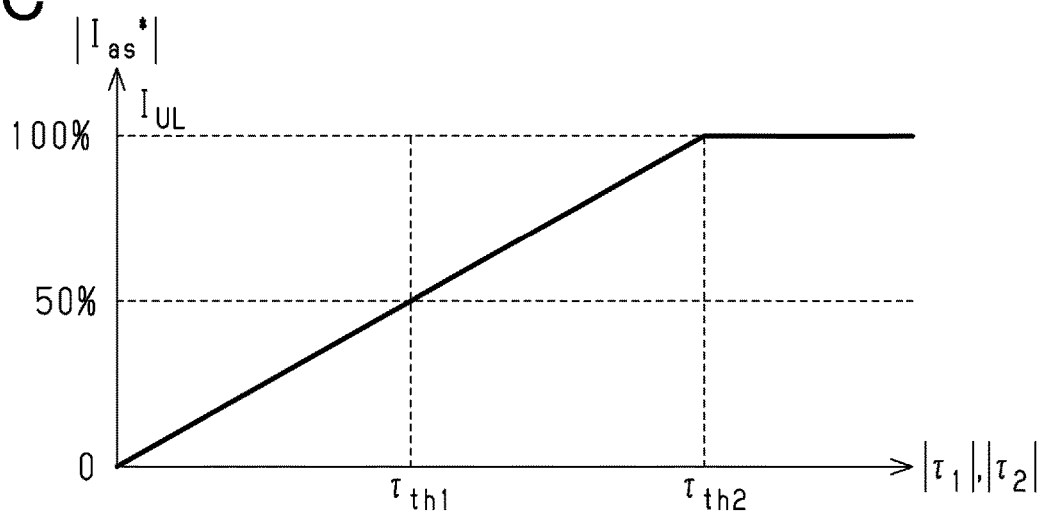
FIG. 4C is a graph illustrating the relationship between the steering torque and a total current command value for the motor shown in FIG. 2 when the motor current for the first coil group and the motor current for the second coil group of the motor are not limited in the first embodiment.

As shown in FIG. 4C, when the steering torque $\tau_1$ or $\tau_2$ is plotted on the horizontal axis and a total current command value $I_{as}{}^*$, which is the sum of the first current command value $I_{as1}{}^*$ and the second current command value $I_{as2}{}^*$, is plotted on the vertical axis, the relationship between the steering torque $\tau_1$ or $\tau_2$ and the current command value $I_{as}{}^*$ is as follows. That is, as the absolute value of the steering torque $\tau_1$ or $\tau_2$ increases from 0, the absolute value of the total current command value $I_{as}{}^*$ increases linearly. When the absolute value of the steering torque $\tau_1$ or $\tau_2$ reaches the torque threshold value $\tau_{th1}$ and then reaches the torque threshold value $\tau_{th2}$, the absolute value of the total current command value $I_{as}{}^*$ reaches a maximum value $I_{UL}$. The absolute value of the maximum value $I_{UL}$ of the total current command value $I_{as}{}^*$ corresponds to the maximum torque (100%) that can be generated by the motor 31. After the absolute value of the steering torque $\tau_1$ or $\tau_2$ reaches the torque threshold value $\tau_{th2}$, the absolute value of the total current command value $I_{as}{}^*$ remains the maximum value $I_{UL}$ while the absolute value of the steering torque $\tau_1$ or $\tau_2$ increases.

Thus, the torque generated by the first coil group 52 and the torque generated by the second coil group 53 are basically half values (50%) of the maximum torque that can be generated by the motor 31, which are well-balanced, although they are generated at different points in time. The motor 31 generates the total torque generated by these two coil groups. However, this may cause the maximum torque that can be generated by the first coil group 52 to differ from the maximum torque that can be generated by the second coil group 53 in an unbalanced manner. These two types of maximum torque become unbalanced in, for example, the following three situations (A1), (A2), and (A3).

(A1) The power supply voltage supplied by the first drive circuit 61 and the power supply voltage supplied by the second drive circuit 71 differ from each other although they are within the assist guarantee voltage range, and the driver performs high-speed steering.

(A2) When the power supply voltage supplied to one of the first drive circuit 61 and the second drive circuit 71 decreases, the torque generated by the first coil group 52 or the second coil group 53 corresponding to the control system with the decreased power supply voltage is limited in order to prevent further decreases in the power supply voltage.

(A3) In order to protect the first coil group 52 or the second coil group 53 from overheating, the torque generated by the first coil group 52 or the second coil group 53 that is subject to overheating protection is limited.

In situations (A1) and (A2), the power supply voltage in the two control systems change due to a supply voltage of the direct-current power supply 81 or an alternator, variation in a resistance value of a wire harness, or deterioration of the wire harness.

Figure 5:
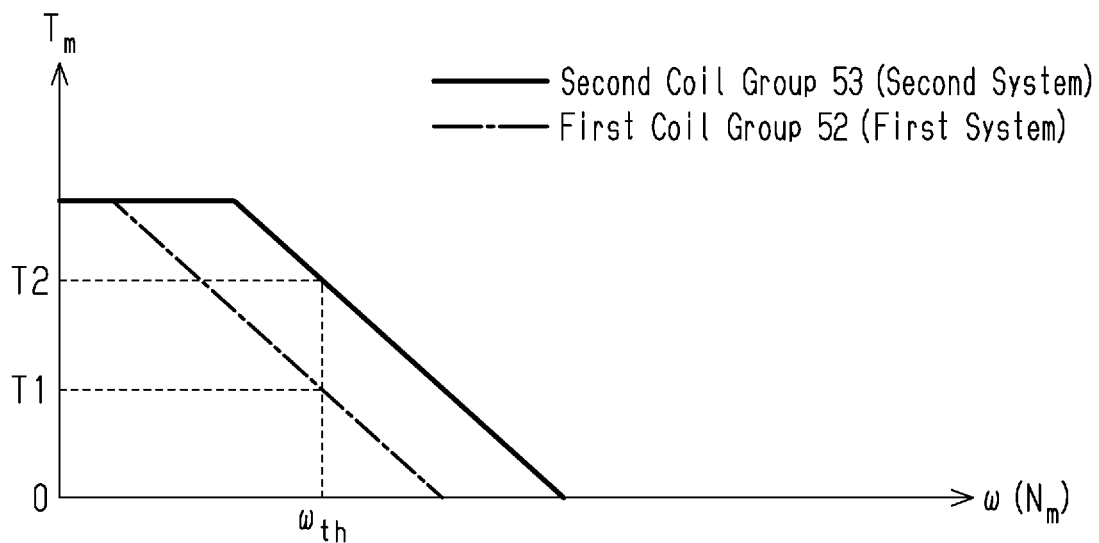
FIG. 5 is a graph illustrating the relationship between a steering speed (the rotation speed of the motor) obtained when a power supply voltage for the first controller of the motor control device shown in FIG. 2 decreases and the torque of the motor generated by the first coil group and the second coil group in the first embodiment.

One example of situation (A1) is as follows. That is, FIG. 5 shows the relationship between a steering speed w (the rotation speed of the motor 31) and a torque T. of the motor 31. In this relationship, as the steering speed ω increases, the torque $T_m$ generated by the first coil group 52 and the second coil group 53 decreases. For example, when the power supply voltage supplied to the first drive circuit 61 decreases to a value lower than the power supply voltage supplied to the second drive circuit 71 and the steering speed is hypothetically a set value $\omega_{th}$ (>0), a torque T1 that can be generated by the first coil group 52 has a value lower than a torque T2 that can be generated by the second coil group 53.

Figure 6:
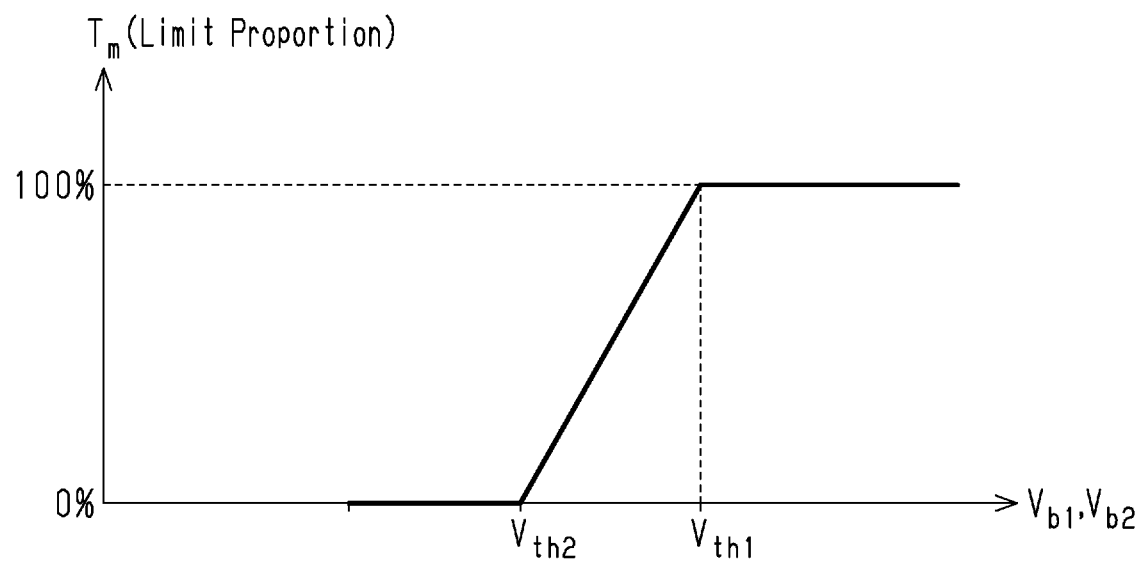
FIG. 6 is a graph illustrating the relationship between a limit percentage of a motor torque and a power supply voltage for the first controller or the second controller of the motor control device shown in FIG. 2 in the first embodiment.

One example of situation (A2) is as follows. As shown in FIG. 6, when voltage $V_{b1}$ or $V_{b2}$ of the direct-current power supply 81 detected by the voltage sensor 65 or 75 is larger than a first voltage threshold value $V_{th1}$, the voltage $V_{b1}$ or $V_{b2}$ is a normal value. In this case, the torque generated by the first coil group 52 and the torque generated by the second coil group 53 are not limited, and an output of 100% can be achieved. When the value of the voltage $V_{b1}$ or $V_{b2}$ is less than or equal to the first voltage threshold value $V_{th1}$, the torque generated by the first coil group 52 and the torque generated by the second coil group 53 are limited in accordance with the value of the voltage $V_{b1}$ or the voltage $V_{b2}$. In a case in which the value of the voltage $V_{b1}$ or $V_{b2}$ is greater than a second voltage threshold value $V_{th2}$ ($<V_{th1}$) and less than or equal to the first voltage threshold value $V_{th1}$, the torque generated by the first coil group 52 and the torque generated by the second coil group 53 are limited to a larger extent as the value of the voltage $V_{b1}$ or $V_{b2}$ decreases. In a case in which the value of the voltage $V_{b1}$ or $V_{b2}$ is less than or equal to the second voltage threshold value $V_{th2}$, the torque generated by the first coil group 52 and the torque generated by the second coil group 53 are limited to 0, and the output becomes 0%.

A comparative example will now be described. The comparative example shows the relationship between the steering torque $\tau_1$ or $\tau_2$ and the total current command value $I_{as}*$ that is obtained when the maximum torque that can be generated by the first coil group 52 differs from the maximum torque that can be generated by the second coil group 53 in an unbalanced manner. In this case, for example, any one of the situations (A1) to (A3) causes the torque generated by the first coil group 52 to be limited. Limiting the first current command value $I_{as1}*$ limits the amount of current supplied to the first coil group 52 and consequently limits the value of the torque generated by the first coil group 52.

Figure 7A:
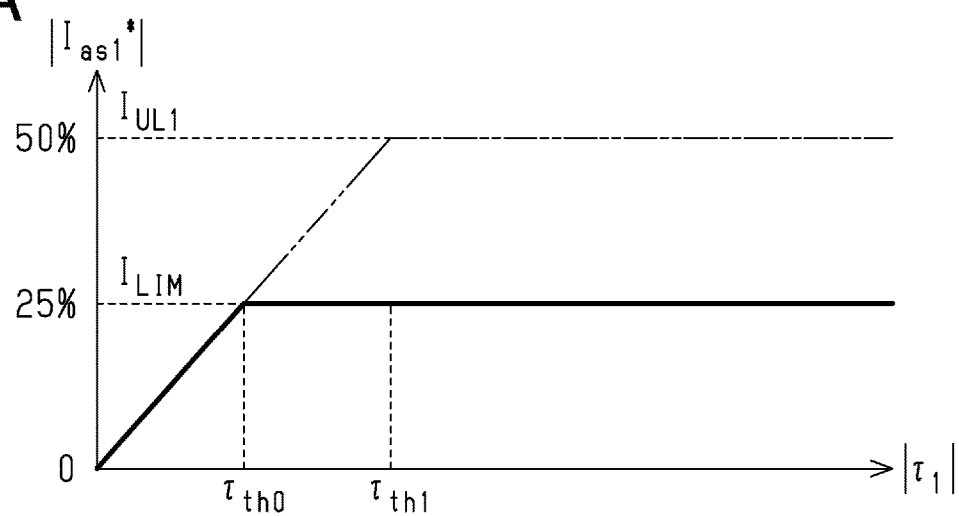
FIG. 7A is a graph illustrating the relationship between the steering torque and the first current command value for the first coil group when the motor current for the first coil group is limited in a comparative example.

As shown in the graph of FIG. 7A, an upper limit value $I_{LIM}$ of the first current command value $I_{as1}*$ is set to a value corresponding to half of the original upper limit value $I_{UL1}$, that is, a value corresponding to one-fourth (25%) of the maximum torque that can be generated by the motor 31. The degree of limitation of the first current command value $I_{as1}*$ varies depending on a steering state and heat-generating states of the power supply voltage and the motor 31. At the point in time the absolute value of the steering torque $\tau_1$ reaches a torque threshold value $\tau_{th0}$ ($<\tau_{th1}$), the first current command value $I_{as1}*$ reaches the upper limit value $I_{LIM}$. In FIG. 7A, the first current command value $I_{as1}*$ when the upper limit value $I_{UL1}$ is not limited is shown by the long dashed double-short dashed line.

Figure 7B:
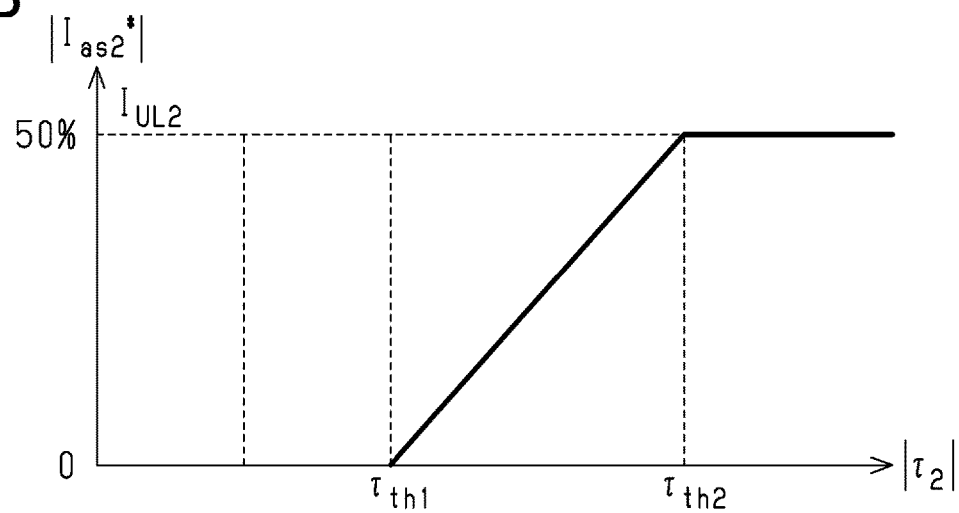
FIG. 7B is a graph illustrating the relationship between the steering torque and the second current command value for the second coil group when the motor current for the second coil group is not limited in the comparative example.

As shown in the graph of FIG. 7B, the upper limit value $I_{UL2}$ of the second current command value $I_{as2*}$ is not limited. Thus, after the absolute value of the steering torque $\tau_2$ reaches the torque threshold value $\tau_{th1}$, the absolute value of the second current command value $I_{as1}*$ increases linearly while the absolute value of the steering torque $\tau_2$ increases. At the point in time the absolute value of the steering torque $\tau_2$ reaches the torque threshold value $\tau_{th2}$, the absolute value of the second current command value $I_{as2}*$ reaches the upper limit value $I_{UL2}$.

Figure 7C:
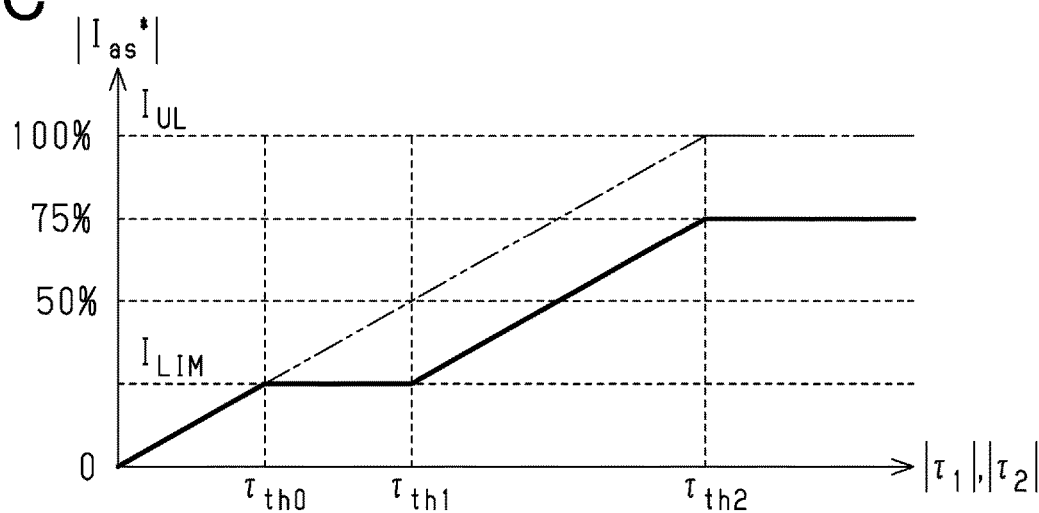
FIG. 7C is a graph illustrating the relationship between the steering torque and the total current command value for the motor when the motor current for the first coil group is limited in the comparative example.

As shown in FIG. 7C, the absolute value of the total current command value $I_{as}*$, which is the sum of the first current command value $I_{as1}*$ and the second current command value $I_{as1}*$, increases linearly as the absolute value of the steering torque $\tau_1$ or $\tau_2$ increases until the absolute value of the steering torque $\tau_1$ or $\tau_2$ reaches the torque threshold value $\tau_{th0}$. After the absolute value of the steering torque $\tau_1$ or $\tau_2$ reaches the torque threshold value $\tau_{th0}$, the first current command value $I_{as1}*$ is limited to the upper limit value $I_{LIM}$. Thus, the absolute value of the total current command value $I_{as1}*$ remains certain (=$I_{LIM}$) while the absolute value of the steering torque $\tau_1$ or $\tau_2$ increases. After the absolute value of the steering torque $\tau_1$ or $\tau_2$ reaches the torque threshold value $\tau_{th1}$, the second current command value $I_{as2}*$ is calculated. Thus, the absolute value of the total current command value $I_{as}*$ increases linearly again while the absolute value of the steering torque $\tau_1$ or $\tau_2$. increases. Eventually, when the absolute value of the steering torque $\tau_1$ or $\tau_2$ reaches the torque threshold value $\tau_{th2}$, the absolute value of the total current command value $I_{as}*$ becomes the maximum. The maximum value of the total current command value $I_{as}*$ corresponds to 75% of the maximum torque that can be generated by the motor 31. In FIG. 7C, the current command value $I_{as}*$ when the upper limit value $I_{UL1}$ is not limited is shown by the long dashed double-short dashed line.

In this manner, at the point in time the absolute value of the steering torque $\tau_1$ or $\tau_2$ reaches the torque threshold value $\tau_{th0}$, only the first current command value $I_{as1}*$ (i.e., the torque generated by the first coil group 52) reaches the upper limit value $I_{LIM}$. As a result, the value of assist gain changes before and after the absolute value of the steering torque $\tau_1$ or $\tau_2$ reaches the torque threshold value $\tau_{th0}$ and the absolute value of the steering torque $\tau_1$ or $\tau_2$ reaches the torque threshold value $\tau_{th1}$.

The assist gain refers to a value indicating the ratio of change in the total current command value $I_{as}*$ to the absolute value of the steering torque $\tau_1$ or $\tau_2$, that is, a value indicating the gradient of the current command value $I_{as}*$. Thus, the assist gain refers to a value obtained by dividing the absolute value of the change amount of the current command value $I_{as}*$ by the absolute value of the change amount of the steering torque $\tau_1$ or $\tau_2$. The total current command value $I_{as}*$ corresponds to the total assist torque generated by the motor 31. Thus, the assist gain also refers to a value indicating the ratio of change in the assist torque to the steering torque $\tau_1$ or $\tau_2$.

The assist gain obtained when the absolute value of the steering torque $\tau_1$ or $\tau_2$ is within a range indicated by the following expression (B1) is referred to as assist gain G1, the assist gain obtained when the absolute value of the steering torque $\tau_1$ or $\tau_2$ is within a range indicated by the following expression (B2) is referred to as assist gain G2, and the assist gain obtained when the absolute value of the steering torque $\tau_1$ or $\tau_2$ is within a range indicated by the following expression (B3) is referred to as assist gain G3. In this case, the relationship between the assist gains G1, G2, and G3 is represented by the following expression (C). The assist gain G2 is 0.

$$0 \leq |\tau_1, \tau_2| \leq \tau_{th0} \quad \text{(B1)}$$

$$\tau_{th0} < |\tau_1, \tau_2| \leq \tau_{th1} \quad \text{(B2)}$$

$$\tau_{th1} < |\tau_1, \tau_2| \leq \tau_{th2} \quad \text{(B3)}$$

$$G1 = G3 > G2 \quad \text{(C)}$$

Accordingly, before and after the absolute value of the steering torque $\tau_1$ or $\tau_2$ reaches the torque threshold value $\tau_{th0}$ with operation of the steering wheel 21, the assist gain changes from the assist gain G1 to the assist gain G2 or changes from the assist gain G2 to the assist gain G1. Further, before and after the absolute value of the steering torque $\tau_1$ or $\tau_2$ reaches the torque threshold value $\tau_{th1}$, the assist gain changes from the assist gain G2 to the assist gain G3 or changes from the assist gain G3 to the assist gain G2. The changes in the assist gain cause fluctuation in the steering torque $\tau_1$ or $\tau_2$ or cause torque ripple. The fluctuation or the torque ripple may be uncomfortable for the driver. To overcome such a problem, in the present embodiment, the first microcomputer 63 and the second microcomputer 73 have the following configurations.

As shown in FIG. 3, in addition to the first assist controller 91 and the first current controller 92, the first microcomputer 63 includes a subtractor 93 and an adder 94. The subtractor 93 configures a first calculator, and the adder 94 configures a second calculator. In addition to the second assist controller 101 and the second current controller 102, the second microcomputer 73 includes a subtractor 103 and an adder 104. The subtractor 103 configures the first calculator, and the adder 104 configures the second calculator.

The subtractor 93 of the first microcomputer 63 calculates the difference between the first current command value $I_{as1}^*$, which is calculated by the first assist controller 91, and the value of the current $I_{as1}$, which is detected by the current sensor 66, as a limit amount $\delta I_1$. The limit amount $\delta I_1$ refers to the amount of current indicating to what degree the current actually supplied to the first coil group 52 is limited relative to the first current command value $I_{as1}^*$, which is a target value. When the first current command value $I_{as1}^*$ (i.e., the current supplied to the first coil group 52) is not limited by the first current controller 92, the limit amount $\delta I_1$ is basically 0. This is because the value of the current $I_{m1}$ supplied to the first coil group 52 corresponds to the original first current command value $I_{as1}^*$ calculated by the first assist controller 91.

The subtractor 103 of the second microcomputer 73 calculates the difference between the second current command value $I_{as2}^*$ and the value of current $I_{m2}$, which is detected by the current sensor 76, as a limit amount $\delta I_2$. The limit amount $\delta I_2$ refers to the amount of current indicating to what degree the current actually supplied to the second coil group 53 is limited relative to the second current command value $I_{as1}^*$, which is a target value. When the second current command value $I_{as2}^*$ (i.e., the current supplied to the second coil group 53) is not limited by the second current controller 102, the limit amount $\delta I_2$ is basically 0. This is because the value of the current $I_{m2}$ supplied to the second coil group 53 corresponds to the original second current command value $I_{as2}^*$ calculated by the first assist controller 91.

The adder 94 of the first microcomputer 63 calculates the final first current command value $I_{as1}^*$ by adding the first current command value $I_{as1}^*$, which is calculated by the first assist controller 91, to the limit amount $\delta I_2$, which is calculated by the subtractor 103 of the second microcomputer 73. Thus, when the limit value $I_{lim2}$ is calculated by the second limit controller 74 and the current supplied to the second coil group 53 by the second current controller 102 is limited, the first current command value $I_{as1}^*$ is increased by an amount corresponding to the limited current amount. When the current supplied to the second coil group 53 by the second current controller 102 is not limited, the first current command value $I_{as1}^*$ calculated by the first assist controller 91 is used as the final first current command value $I_{as1}^*$.

The adder 104 of the second microcomputer 73 calculates the final second current command value $I_{as2}^*$ by adding the second current command value $I_{as2}^*$, which is calculated by the first assist controller 91, to the limit amount $\delta I_1$, which is calculated by the subtractor 93 of the first microcomputer 63. Thus, when the limit value $I_{lim1}$ is calculated by the first limit controller 64 and the current supplied to the first coil group 52 by the first current controller 92 is limited, the second current command value $I_{as1}^*$ is increased by an amount corresponding to the limited current amount. When the current supplied to the first coil group 52 by the first current controller 92 is not limited, the second current command value $I_{as1}^*$ calculated by the first assist controller 91 is used as the final second current command value $I_{as1}^*$.

Accordingly, in the present embodiment, when the current supplied to one of the first coil group 52 and the second coil group 53 is limited, the limited current amount is supplemented by increasing the current supplied to the other one of the first coil group 52 and the second coil group 53. This provides the following operation.

Operation of First Embodiment

In the present embodiment, when the maximum torque that can be generated by the first coil group 52 differs from the maximum torque that can be generated by the second coil group 53 in an unbalanced manner, the relationship between the steering torque $\tau_1$ or $\tau_2$ and the total current command value $I_{as}^*$ is as follows. In this case, for example, any one of the above-described situations (A1) to (A3) causes the torque generated by the first coil group 52 to be limited.

Figure 8A:
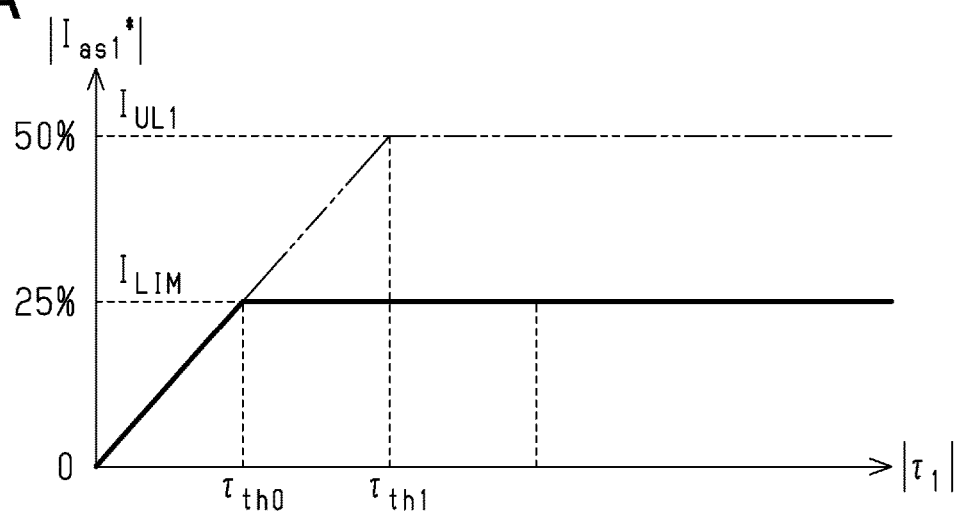
FIG. 8A is a graph illustrating the relationship between the steering torque and the first current command value for the first coil group when the motor current for the first coil group is limited in the first embodiment.

As shown in the graph of FIG. 8A, the upper limit value $I_{LIM}$ of the first current command value $I_{as1}^*$ is set to a value corresponding to half of the original upper limit value $I_{UL1}$, that is, a value corresponding to one-fourth (25%) of the maximum torque that can be generated by the motor 31. At the point in time the absolute value of the steering torque $\tau_1$ reaches the torque threshold value $\tau_{th0}$, the first current command value $I_{as1}^*$ reaches the upper limit value $I_{LIM}$. In FIG. 8A, the first current command value $I_{as1}^*$ when $I_{UL1}$ is not limited is shown by the long dashed double-short dashed line.

Figure 8B:
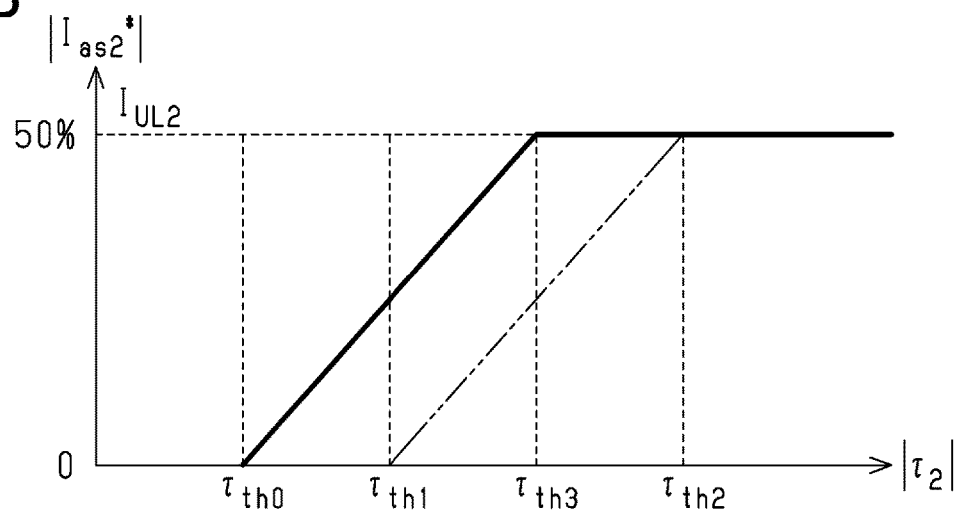
FIG. 8B is a graph illustrating the relationship between the steering torque and the second current command value for the second coil group when the motor current for the second coil group is not limited in the first embodiment.

As shown in the graph of FIG. 8B, the upper limit value $I_{UL2}$ of the second current command value $I_{as2}^*$ is not limited. In this case, the second current command value $I_{as2}^*$ is calculated before the first current command value $I_{as1}^*$ becomes the original upper limit value $I_{UL1}$ (i.e., before the torque that can be generated by the first coil group 52 reaches one-half (50%) of the torque that can be generated by the motor 31). This is because the limit amount $\delta I_1$ calculated by the subtractor 93 of the first microcomputer 63 is added to the original second current command value $I_{as2}^*$ by the adder 104 of the second microcomputer 73. For example, when the original second current command value $I_{as2}^*$ is zero, the limit amount $\delta I_1$ is used as the final second current command value $I_{as1}^*$. After the absolute value of the steering torque $\tau_2$ reaches the torque threshold value $\tau_{th0}$, the absolute value of the second current command value $I_{as2}^*$ increases linearly while the absolute value of the steering torque $\tau_2$ increases. At the point in time the absolute value of the steering torque $\tau_2$ reaches a torque threshold value $\tau_{th3}$ ($<\tau_{th2}$), the absolute value of the second current command value $I_{as2}^*$ reaches the upper limit value $I_{UL2}$. In FIG. 8B, the second current command value $I_{as2}^*$ when the upper limit value $I_{UL1}$ is not limited is shown by the long dashed double-short dashed line.

Accordingly, as the absolute value of the steering torque $\tau_1$ or $\tau_2$ changes, the absolute value of the total current command value $I_{as}^*$ changes as follows.

Figure 8C:
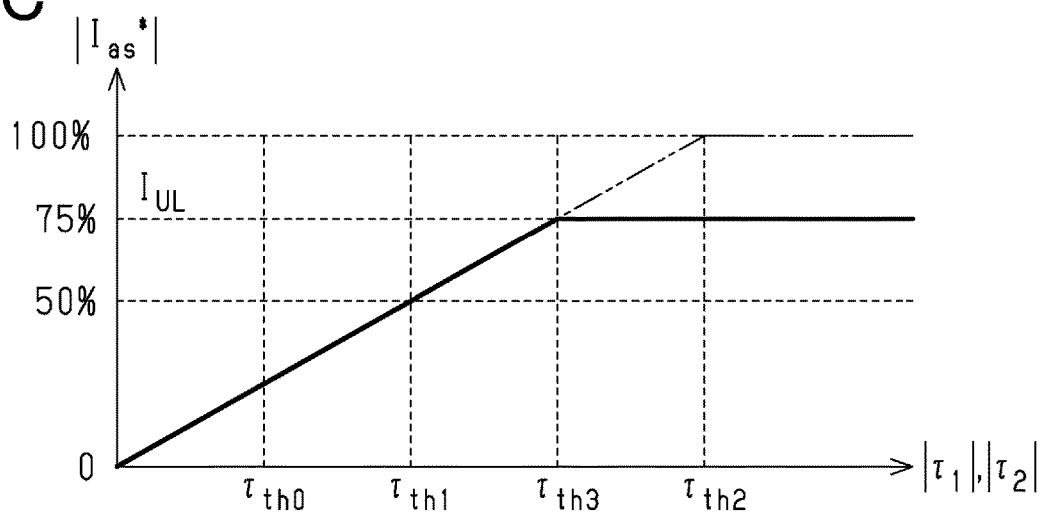
FIG. 8C is a graph illustrating the relationship between the steering torque and the total current command value for the motor when the motor current for the first coil group is limited in the first embodiment.

As shown in FIG. 8C, the absolute value of the total current command value $I_{as}^*$, which is the sum of the first current command value $I_{as1}^*$ and the second current command value $I_{as1}^*$, increases linearly as the absolute value of the steering torque $\tau_1$ or $\tau_2$ increases until the absolute value of the steering torque $\tau_1$ or $\tau_2$ reaches the torque threshold value $\tau_{th3}$ from 0. When the absolute value of the steering torque $\tau_1$ or $\tau_2$ reaches the torque threshold value $\tau_{th3}$, the absolute value of the total current command value $I_{as}^*$ becomes the maximum. The maximum value $I_{UL}$ of the total current command value $I_{as}^*$ corresponds to 75% of the maximum torque that can be generated by the motor 31. After the absolute value of the steering torque $\tau_1$ or $\tau_2$ reaches the torque threshold value $\tau_{th3}$, the absolute value of the total current command value $I_{as}^*$ remains the maximum value $I_{UL}$ while the absolute value of the steering torque $\tau_1$ or $\tau_2$ increases. In FIG. 8C, the current command value $I_{as}^*$ when the upper limit value $I_{UL1}$ is not limited is shown by the long dashed double-short dashed line.

From when the absolute value of the steering torque $\tau_1$ or $\tau_2$ is 0 to when the absolute value reaches the torque threshold value $\tau_{th3}$, the ratio of the increase amount of the absolute value of the current command value $I_{as}^*$ to the increase amount of the absolute value of the steering torque $\tau_1$ or $\tau_2$ is the same as when the torque generated by the first coil group 52 is not limited. That is, when the calculation of the second current command value $I_{as2}^*$ is started at the point in time the first current command value $I_{as1}^*$ reaches the upper limit value $I_{LIM}$, the value of the assist gain of the total current command value $I_{as}^*$ remains constant until the absolute value of the total current command value $I_{as}^*$ reaches the maximum value $I_{UL}$. Although the torque that can be generated by the motor 31 is limited to its maximum value (75%), no change occurs in the value of the assist gain. This limits the fluctuation of the steering torque $\tau_1$ or $\tau_2$. This further limits the degradation of torque ripple and consequently limits the degradation of noise and vibration (NV) characteristics.

The upper limit value $I_{UL2}$ of the second current command value $I_{as2}^*$ is limited in the same manner as the upper limit value $I_{UL1}$ of the first current command value $I_{as1}^*$. When the upper limit value $I_{UL2}$ of the second current command value $I_{as2}^*$ is limited to be smaller than the original value, the first current command value $I_{as1}^*$ may already have reached the upper limit value $I_{UL1}$ at the point in time the second current command value $I_{as1}^*$ reaches the limited upper limit value. Thus, although the final first current command value $I_{as1}^*$ supplied to the first current controller 92 is larger than the original upper limit value $L_{UL1}$ by an amount corresponding to the limit amount $\delta I_2$, the final first current command value $I_{as1}^*$ is eventually limited to the upper limit value $L_{UL1}$ by the first current controller 92.

Based on such limitation, in the present embodiment, the adder 94 may be omitted from the first microcomputer 63, and the subtractor 103 may be omitted from the second microcomputer 73. That is, even when the upper limit value $I_{UL2}$ of the second current command value $I_{as1}^*$ is limited to be smaller than the original value, the ECU 40 does not add the limit amount $\delta I_2$ to the first current command value $I_{as1}^*$. Even in such a case, the value of the assist gain of the total current command value $I_{as}^*$ remains constant until the second current command value $I_{as2}^*$ reaches the upper limit value subsequent to being limited.

Advantages of First Embodiment

The present embodiment provides the following advantages.

(1) When the first current command value $I_{as1}^*$ is limited to the upper limit value $I_{LIM}$, which is smaller than the original upper limit value $I_{UL1}$, the ECU 40 increases the second current command value $I_{as2}^*$ for the second coil group 53 by an amount corresponding to the limited current command value $I_{as}^*$ before the current command value $I_{as}^*$ corresponding to the target assist torque exceeds the original upper limit value $\tau_{UL1}$ for the first current command value $I_{as1}^*$. This prevents the total current command value $I_{as}^*$, which is the sum of the first current command value $I_{as1}^*$ and the second current command value $I_{as2}^*$, from being fixed to the upper limit value $I_{LIM}$ subsequent to being limited relative to a change in the target assist torque (i.e., a change in the steering torque $\tau_1$ or $\tau_2$). Thus, the total current command value $I_{as}^*$ can be changed at a certain ratio relative to a change in the target assist torque. Thus, the total motor torque generated by the first coil group 52 and the second coil group 53 can be changed at a certain ratio. This limits fluctuation of the steering torque $\tau_1$ or $\tau_2$ or limits torque ripple. Further, the driver can obtain a favorable sense of steering.

(2) When the first current command value $I_{as1}^*$ is limited to be smaller than the original upper limit value $I_{UL1}$, an actual value of the current $I_{m1}$ supplied to the first coil group 52 in accordance with the limited first current command value $I_{as1}^*$ does not become a value corresponding to the first current command value $I_{as1}^*$ prior to being limited. Thus, the limit amount $\delta I_1$, which is the difference between the first current command value $I_{as1}^*$ prior to being limited for the first coil group 52 and an actual value of the current $I_{m1}$ supplied to the first coil group 52, reflects to what degree the first current command value $I_{as1}^*$ is limited relative to the original upper limit value $I_{UL1}$. Accordingly, the first current command value $I_{as1}^*$ that is to be limited can be supplemented by adding the limit amount $\delta I_1$ to the second current command value $I_{as2}^*$ for the second coil group 53 corresponding to another control system. Further, the second current command value $I_{as2}^*$ is limited to be smaller than the original upper limit value $I_{UL2}$ in the same manner as when the first current command value $I_{as1}^*$ is limited to be smaller than the upper limit value $I_{UL1}$.

(3) The ECU 40 includes the first controller 60 and the second controller 70, which respectively control power feeding to the first coil group 52 or power feeding to the second coil group 53 independently for each control system. Thus, even when one of the first coil group 52 and the second coil group 53 or when one of the first controller 60 and the second controller 70 fails to work, the motor 31 can be operated by using the remaining normal one of the coil groups or the remaining normal one of the controllers. This increases the reliability of the operation of the motor 31.

(4) When the current command value $I_{as}^*$ exceeds the upper limit value $I_{UL1}$ of the first current command value $I_{as1}^*$ for the first coil group 52, the current command value corresponding to the exceeding amount is set to the second current command value $I_{as2}^*$ for the remaining one of the coil groups (i.e., the second coil group 53). Thus, the control load of a first system including the first controller 60 and the first coil group 52 differs from that of a second system including the second controller 70 and the second coil group 53. More specifically, a period during which power is fed to the second coil group 53 is shorter than a period during which power is fed to the first coil group 52. Thus, the control load of the second system is smaller than that of the first system. This prevents the same components of the first system and the second system corresponding to each other from having an anomaly at the same timing that is caused when deviation occurs between the control load of the first system and the control load of the second system.

Second Embodiment

A motor control device according to a second embodiment will now be described. The present embodiment has the same configuration as the first embodiment, which is shown in FIGS. 1 to 3. In the present embodiment, the assist torque required to be generated by the motor 31 is covered equally by the torque generated by the first coil group 52 and the torque generated by the second coil group 53. The upper limit values of the first current command value $I_{as1}*$ and the second current command value $I_{as1}*$ are each set to half (50%) of the maximum value (100%) of the current command value corresponding to the maximum torque that can be generated by the motor 31.

The relationship between the steering torque $\tau_1$ or $\tau_2$ and the current command value when the current supplied to the first coil group 52 and the current supplied to the second coil group 53 are not limited is as follows.

Figure 9A:
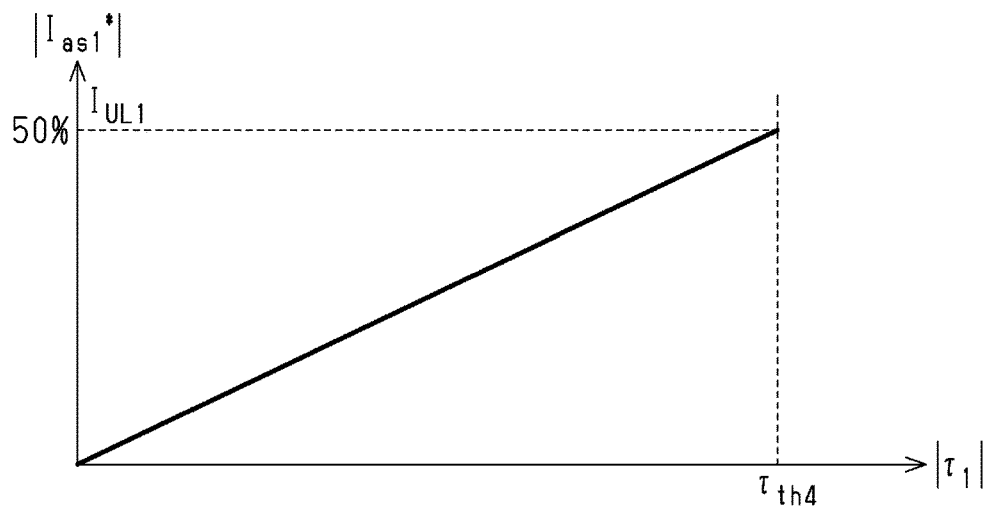
FIG. 9A is a graph illustrating the relationship between the steering torque and the first current command value for the first coil group when the motor current for the first coil group is not limited in a second embodiment.

As shown in FIG. 9A, when the steering torque $\tau_1$ is plotted on the horizontal axis and the first current command value $I_{as1}*$ is plotted on the vertical axis, the relationship between the steering torque $\tau_1$ and the first current command value $I_{as1}*$ is as follows. That is, as the absolute value of the steering torque $\tau_1$ increases, the absolute value of the first current command value $I_{as1}*$ increases linearly. When the absolute value of the steering torque $\tau_1$ reaches a torque threshold value $\tau_{th4}$, the absolute value of the first current command value $I_{as1}*$ becomes the maximum. The maximum value of the first current command value $I_{as1}*$ corresponds to half (50%) of the maximum torque that can be generated by the motor 31.

Figure 9B:
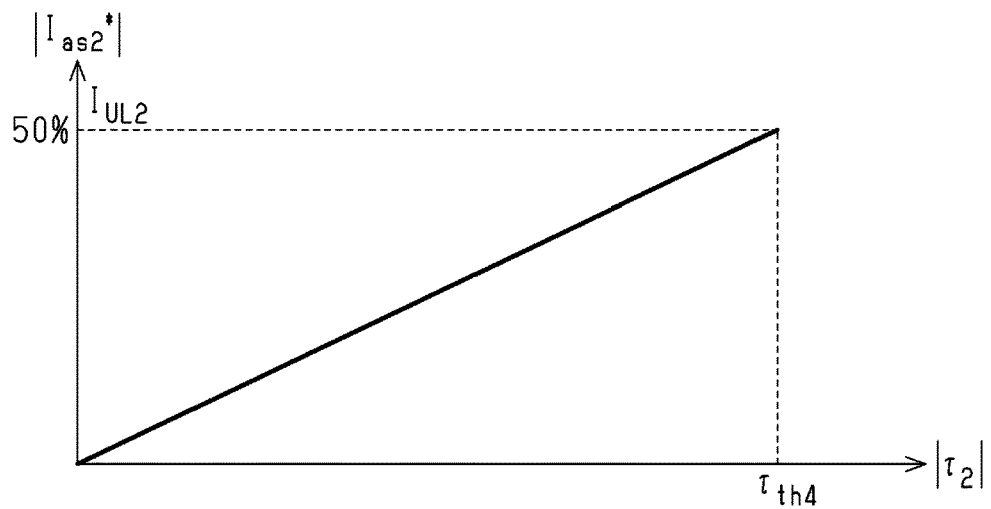
FIG. 9B is a graph illustrating the relationship between the steering torque and the second current command value for the second coil group when the motor current for the second coil group is not limited in the second embodiment.

As shown in FIG. 9B, when the steering torque $\tau_2$ is plotted on the horizontal axis and the second current command value $I_{as1}*$ is plotted on the vertical axis, the relationship between the steering torque $\tau_2$ and the second current command value $I_{as1}*$ is as follows. That is, as the absolute value of the steering torque $\tau_2$ increases, the absolute value of the second current command value $I_{as1}*$ increases linearly. When the absolute value of the steering torque $\tau_2$ reaches the torque threshold value $\tau_{th4}$, the absolute value of the second current command value $I_{as2}*$ becomes the maximum. The maximum value of the second current command value $I_{as1}*$ corresponds to half (50%) of the maximum torque that can be generated by the motor 31.

Figure 9C:
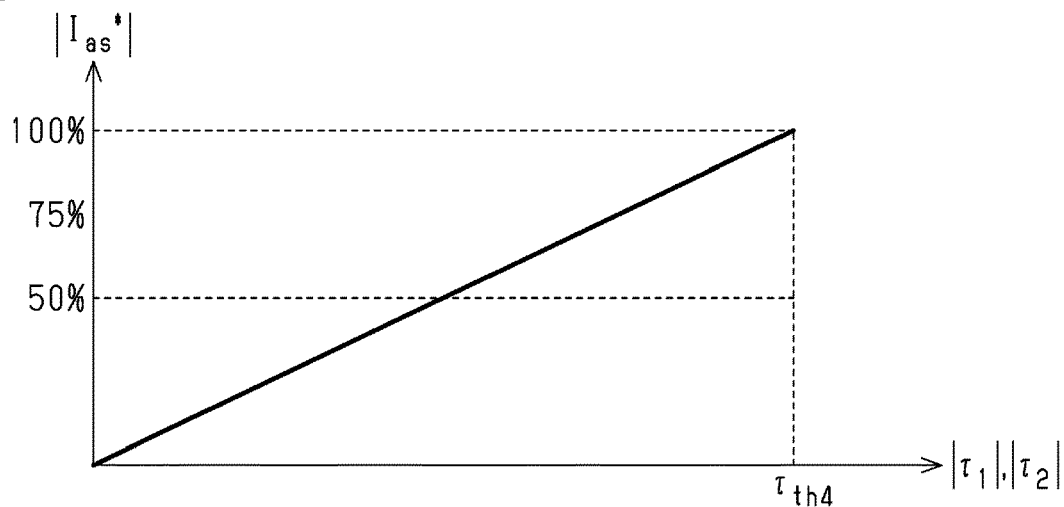
FIG. 9C is a graph illustrating the relationship between the steering torque and the total current command value for the motor when the motor current for the first coil group and the motor current for the second coil group are not limited in the second embodiment.

As shown in FIG. 9C, when the steering torque $\tau_1$ or $\tau_2$ is plotted on the horizontal axis and the total current command value $I_{as}*$, which is the sum of the first current command value $I_{as1}*$ and the second current command value $I_{as1}*$, is plotted on the vertical axis, the relationship between the steering torque $\tau_1$ or $\tau_2$ and the current command value $I_{as}*$ is as follows. That is, as the absolute value of the steering torque $\tau_1$ or $\tau_2$ increases, the absolute value of the total current command value $I_{as}*$ increases linearly. When the absolute value of the steering torque $\tau_1$ or $\tau_2$ reaches the torque threshold value $\tau_{th4}$, the absolute value of the total current command value $I_{as}*$ becomes the maximum. The maximum value of the total current command value $I_{as}*$ corresponds to the maximum torque (100%) that can be generated by the motor 31.

Thus, the torque generated by the first coil group 52 and the torque generated by the second coil group 53 basically have the same value and are well-balanced. The motor 31 generates the total torque generated by these two coil groups. However, in the same manner as the first embodiment, any one of the above-described conditions may cause the maximum torque generated by the first coil group 52 to differ from the maximum torque generated by the second coil group 53 in an unbalanced manner.

A further comparative example will now be described. The comparative example shows the relationship between the steering torque $\tau_1$ or $\tau_2$ and the total current command value $I_{as}*$ when the maximum torque that can be generated by the first coil group 52 differs from the maximum torque that can be generated by the second coil group 53 in an unbalanced manner. In this case, for example, the torque generated by the first coil group 52 is limited.

Figure 10A:
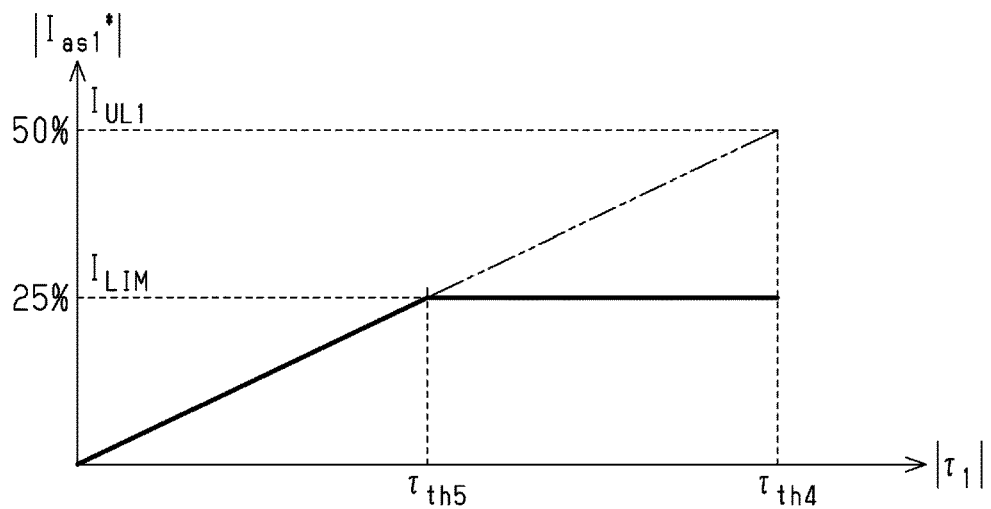
FIG. 10A is a graph illustrating the relationship between the steering torque and the first current command value for the first coil group when the motor current for the first coil group is limited in a further comparative example.

As shown in the graph of FIG. 10A, the upper limit value $I_{LIM}$ of the first current command value $I_{as1}*$ is set to a value corresponding to the half of the original upper limit value $I_{UL1}$, that is, a value corresponding to one-fourth (25%) of the maximum torque that can be generated by the motor 31. The degree of limitation of the first current command value $I_{as1}*$ varies depending on a steering state and heat-generating states of the power supply voltage and the motor 31. At the point in time the absolute value of the steering torque $\tau_1$ reaches a torque threshold value $\tau_{th5}$ ($<\tau_{th4}$), the first current command value $I_{as1}*$ reaches the upper limit value $I_{LIM}$. In FIG. 10A, the first current command value $I_{as1}*$ when the upper limit value $I_{UL1}$ is not limited is shown by the long dashed double-short dashed line.

Figure 10B:
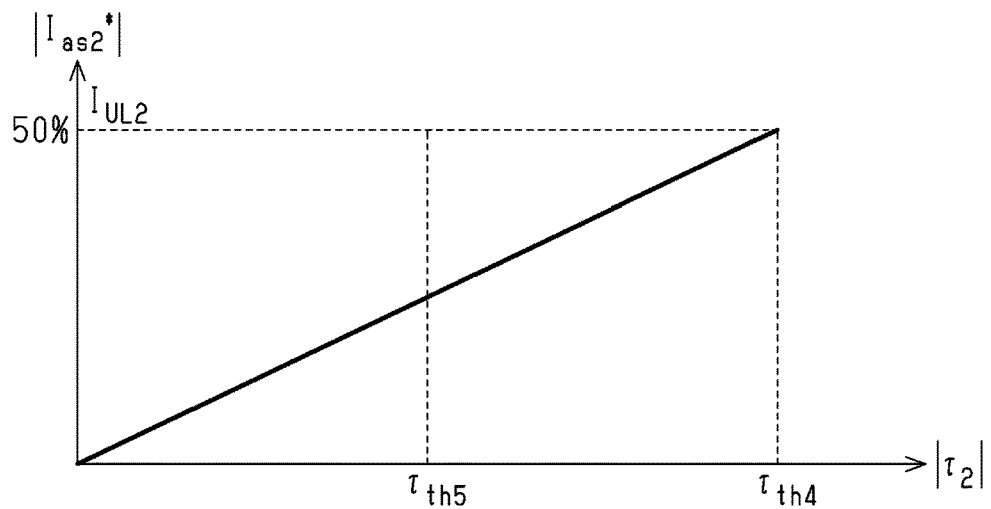
FIG. 10B is a graph illustrating the relationship between the steering torque and the second current command value for the second coil group when the motor current for the second coil group is not limited in the further comparative example.

As shown in FIG. 10B, the upper limit value of the second current command value $I_{as1}*$ is not limited. Thus, the second current command value $I_{as1}*$ reaches the upper limit value $I_{UL2}$ at the point in time the absolute value of the steering torque $\tau_2$ reaches the torque threshold value $\tau_{th4}$. That is, after the absolute value of the steering torque $\tau_1$ or $\tau_2$ reaches the torque threshold value $\tau_{th5}$, the maximum value of the first current command value $I_{as1}*$ differs from the maximum value of the second current command value $I_{as1}*$ in an unbalanced manner. In other words, after the absolute value of the steering torque $\tau_1$ or $\tau_2$ reaches the torque threshold value $\tau_{th5}$, the maximum torque that can be generated by the first coil group 52 differs from the maximum torque that can be generated by the second coil group 53 in an unbalanced manner.

Figure 10C:
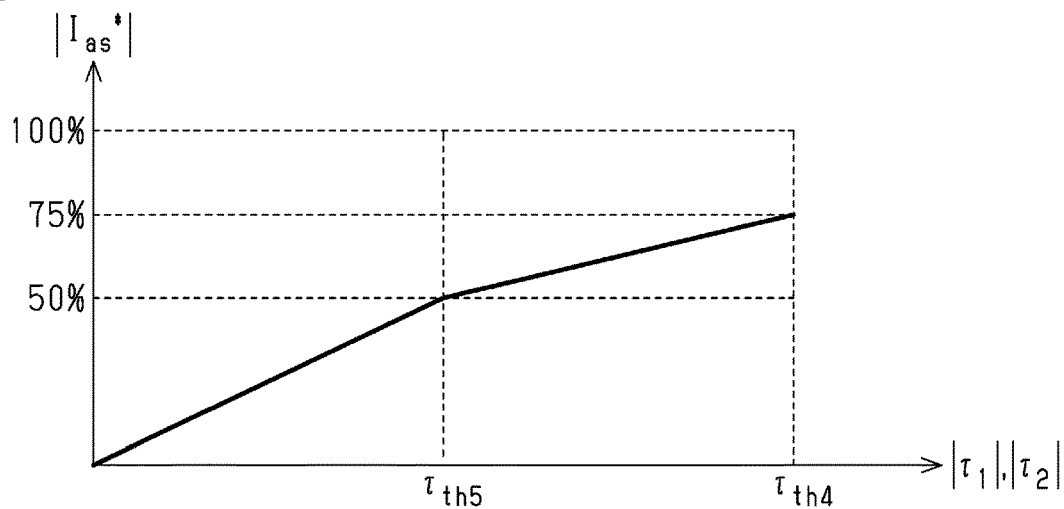
FIG. 10C is a graph illustrating the relationship between the steering torque and the total current command value for the motor when the motor current for the first coil group is limited in the further comparative example.

As shown in FIG. 10C, the absolute value of the total current command value $I_{as}*$, which is the sum of the first current command value $I_{as1}*$ and the second current command value $I_{as1}*$, increases linearly as the absolute value of the steering torque $\tau_1$ or $\tau_2$ increases until the absolute value of the steering torque $\tau_1$ or $\tau_2$ reaches the torque threshold value $\tau_{th5}$. After the absolute value of the steering torque $\tau_1$ or $\tau_2$ reaches the torque threshold value $\tau_{th5}$, the absolute value of the total current command value $I_{as}*$ increases linearly while the absolute value of the steering torque $\tau_1$ or $\tau_2$ increases. However, after the absolute value of the steering torque $\tau_1$ or $\tau_2$ reaches the torque threshold value $\tau_{th5}$, the first current command value $I_{as1}*$ is limited to the upper limit value $I_{LIM}$ ($<I_{UL1}$). Thus, the ratio of the increase amount of the absolute value of the total current command value $I_{as}*$ to the increase amount of the absolute value of the steering torque $\tau_1$ or $\tau_2$ (i.e., assist gain) becomes smaller after the absolute value of the steering torque $\tau_1$ or $\tau_2$ reaches the torque threshold value $\tau_{th5}$ than before the absolute value of the steering torque $\tau_1$ or $\tau_2$ reaches the torque threshold value $T_{th5}$. Eventually, when the absolute value of the steering torque $\tau_1$ or $\tau_2$ reaches the torque threshold value $\tau_{th4}$, the absolute value of the total current command value $I_{as}*$ becomes the maximum. The maximum value of the total current command value $I_{as}*$ corresponds to 75% of the maximum torque that can be generated by the motor 31.

Thus, since the assist gain changes before and after the absolute value of the steering torque $\tau_1$ or $\tau_2$ reaches the torque threshold value $\tau_{th5}$, fluctuation of the steering torque $\tau_1$ or $\tau_2$ or torque ripple occurs. The fluctuation or the torque ripple may be uncomfortable for the driver.

In the present embodiment, the first microcomputer 63 and the second microcomputer 73 have the same configuration as the above-described configuration shown in FIG. 3. That is, when the current supplied to one of the first coil group 52 and the second coil group 53 is limited, the limited current amount is supplemented by increasing the current supplied to the other one of the first coil group 52 and the second coil group 53. This provides the following operation.

Operation of Second Embodiment

In the present embodiment, when the maximum torque that can be generated by the first coil group 52 differs from the maximum torque that can be generated by the second coil group 53 in an unbalanced manner, the relationship between the steering torque $\tau_1$ or $\tau_2$ and the total current command value $I_{as}*$ is as follows. In this case, for example, any one of the above-described situations (A1) to (A3) causes the torque generated by the first coil group 52 to be limited.

Figure 11A:
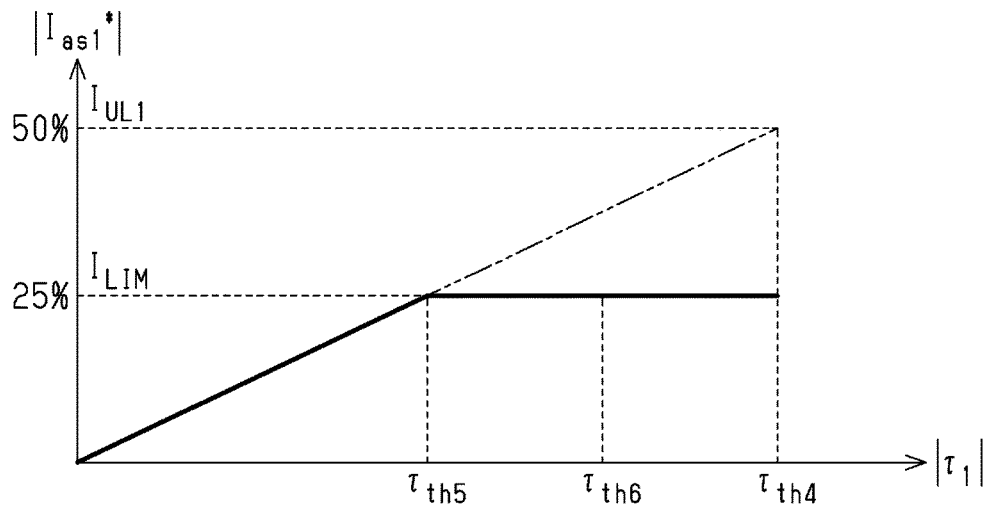
FIG. 11A is a graph illustrating the relationship between the steering torque and the first current command value for the first coil group when the motor current for the first coil group is limited in the second embodiment.

As shown in the graph of FIG. 11A, the upper limit value $I_{LIM}$ of the first current command value $I_{as1}*$ is set to a value corresponding to the half of the original upper limit value $I_{UL1}$, that is, a value corresponding to one-fourth (25%) of the maximum torque that can be generated by the motor 31. At the point in time the absolute value of the steering torque $\tau_1$ reaches the torque threshold value $\tau_{th5}$, the first current command value $I_{as1}*$ reaches the upper limit value $I_{LIM}$. In FIG. 11A, the first current command value $I_{as1}*$ when the upper limit value $I_{UL1}$ is not limited is shown by the long dashed double-short dashed line.

Figure 11B:
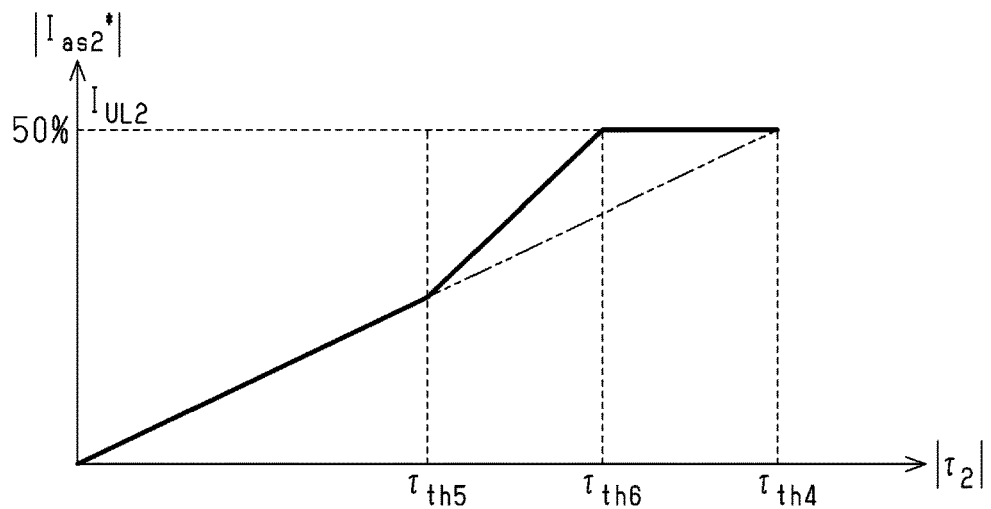
FIG. 11B is a graph illustrating the relationship between the steering torque and the second current command value for the second coil group when the motor current for the second coil group is not limited in the second embodiment.

As shown in the graph of FIG. 11B, the upper limit value $I_{UL2}$ of the second current command value $I_{as2*}$ is not limited. However, the ratio of the increase amount of the absolute value of the second current command value $I_{as1}*$ to the increase amount of the absolute value of the steering torque $\tau_2$ (i.e., assist gain) becomes larger after the absolute value of the steering torque $\tau_2$ reaches the torque threshold value $\tau_{th5}$ than before the absolute value of the steering torque $\tau_2$ reaches the torque threshold value $\tau_{th5}$. This is because the limit amount $\delta I_1$ calculated by the subtractor 93 of the first microcomputer 63 is added to the original second current command value $I_{as1}*$ by the adder 104 of the second microcomputer 73. After the absolute value of the steering torque $\tau_2$ reaches the torque threshold value $\tau_{th5}$, the absolute value of the second current command value $I_{as1}*$ increases linearly while the absolute value of the steering torque $\tau_2$ increases. At the point in time the absolute value of the steering torque $\tau_2$ reaches a torque threshold value $\tau_{th6}$ ($\tau_{th5}<\tau_{th6}<\tau_{th4}$), the absolute value of the second current command value $I_{as2}*$ reaches the upper limit value $I_{UL2}$. In FIG. 11B, the second current command value $I_{as2}*$ when the upper limit value $I_{UL1}$ is not limited is shown by the long dashed double-short dashed line.

Accordingly, as the absolute value of the steering torque $\tau_1$ or $\tau_2$ changes, the absolute value of the total current command value $I_{as}*$ changes as follows.

Figure 11C:
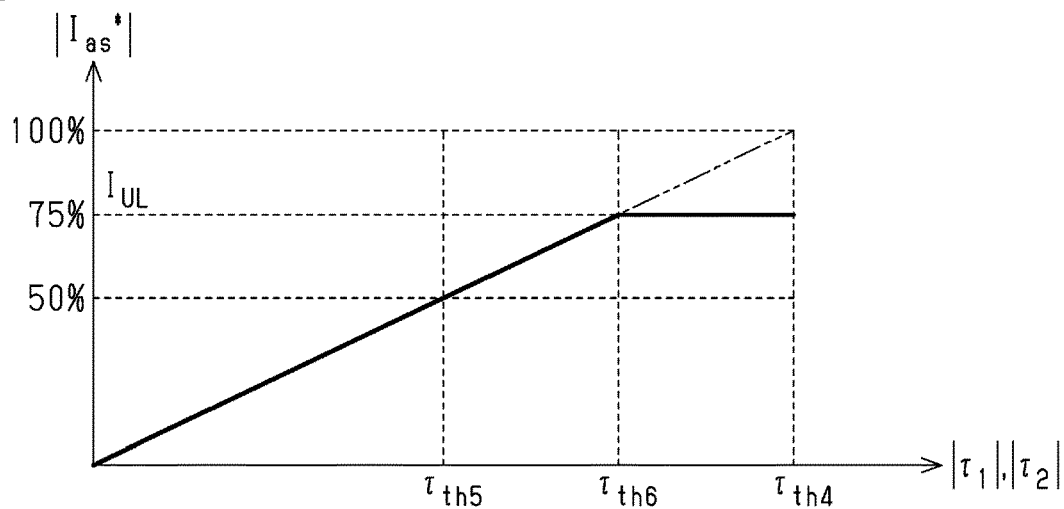
FIG. 11C is a graph illustrating the relationship between the steering torque and the total current command value for the motor when the motor current for the first coil group is limited in the second embodiment.

As shown in FIG. 11C, the absolute value of the total current command value $I_{as}*$, which is the sum of the first current command value $I_{as1}*$ and the second current command value $I_{as2}*$, increases linearly as the absolute value of the steering torque $\tau_1$ or $\tau_2$ increases until the absolute value of the steering torque $\tau_1$ or $\tau_2$ reaches the torque threshold value $\tau_{th6}$ from 0. When the absolute value of the steering torque $\tau_1$ or $\tau_2$ reaches the torque threshold value $\tau_{th6}$, the absolute value of the total current command value $I_{as}*$ becomes the maximum. The maximum value $I_{UL}$ of the total current command value $I_{as}*$ corresponds to 75% of the maximum torque that can be generated by the motor 31. After the absolute value of the steering torque $\tau_1$ or $\tau_2$ reaches the torque threshold value $\tau_{th6}$, the absolute value of the total current command value $I_{as}*$ remains the maximum value $I_{UL}$ while the absolute value of the steering torque $\tau_1$ or $\tau_2$ increases. In FIG. 11C, the current command value $I_{as}*$ when the upper limit value $I_{UL1}$ is not limited is shown by the long dashed double-short dashed line.

Thus, after the first current command value $I_{as1}*$ is limited to the upper limit value $I_{LIM}$, increasing the second current command value $I_{as1}*$ by an amount corresponding to the limit amount $\delta I_1$, which is the limited current amount, causes the value of assist gain of the total current command value $I_{as}*$ to remain constant until the absolute value of the total current command value $I_{as}*$ reaches the maximum value $I_{UL}$. Although the torque that can be generated by the motor 31 is limited to its maximum value (75%), no change occurs in the value of the assist gain. This limits the fluctuation of the steering torque $\tau_1$ or $\tau_2$. This further limits the degradation of torque ripple and consequently limits the degradation of NV characteristics.

The upper limit value of the second current command value $I_{as2}*$ is limited in the same manner as the upper limit value of the first current command value $I_{as1}*$. After the upper limit value of the second current command value $\delta I_{as2}*$ is limited to a value smaller than the original upper limit value $I_{UL2}$, the first current command value $I_{as1}*$ is increased by an amount corresponding to the limit amount $\delta I_2$, which is the limited current amount.

The second embodiment provides the same advantages as advantages (1) to (3) of the first embodiment.

Third Embodiment

A motor control device according to a third embodiment will now be described. The present embodiment has the same configuration as the first embodiment, which is shown in FIGS. 1 to 3.

Recently, development has been actively made for an autonomous driving system having an autonomous driving function in which the system performs driving instead of a human driver. The autonomous driving system includes a cooperative control system such as an advanced driver-assistance systems (ADAS), which aids a driver's driving operation in order to further improve the safety and convenience for a vehicle. When the vehicle is equipped with the autonomous driving system, cooperative control is performed by the ECU 40 and another controller of an onboard system in the vehicle. In cooperative control, multiple types of controllers of an onboard system cooperate with each other to control the movement of a vehicle.

As shown by the long dashed double-short dashed line in FIG. 1, the vehicle is equipped with, for example, an upper ECU 200 (also referred to as ADAS-ECU), which performs centralized control of various controllers of the onboard system. The upper ECU 200 obtains an optimal control method based on the present state of the vehicle and instructs various onboard controllers to execute individual control in accordance with the obtained control method. The upper ECU 200 intervenes with the control executed by the ECU 40. The upper ECU 200 switches its autonomous driving control function between on and off based on operation of a switch (not shown) arranged on a driver sear or the like.

When the autonomous driving control function of the upper ECU 200 is turned on, the operation of the steering wheel 21 is executed by the upper ECU 200. The ECU 40 controls the motor 31 based on instructions from the upper ECU 200 to execute steering control that steers the steerable wheels 26 (i.e., autonomous steering control). The upper ECU 200 calculates, for example, steered angle instruction values $\theta_1^*$ and $\theta_2^*$ as instruction values used to cause the vehicle to travel on a target lane. Each of the steered angle instruction values $\theta1^*$ and $\theta2^*$ is a target value of the steered angle $\theta_w$ necessary to cause the vehicle to travel along a lane in accordance with the present traveling state of the vehicle or a target value of a state amount reflecting the steered angle $\theta_w$. The state amount reflecting the steered angle $\theta_w$ includes, for example, a pinion angle, which is a rotation angle of the pinion shaft 22c. The ECU 40 controls the motor 31 using the steered angle instruction values $\theta1^*$ and $\theta2^*$, which are calculated by the upper ECU 200.

As shown by the long dashed double-short dashed line in FIG. 2, the steered angle instruction value $\theta_1^*$ is used for the first microcomputer 63. The steered angle instruction value $\theta_2^*$ is used for the second microcomputer 73. The first microcomputer 63 executes angle feedback control, which causes an actual steered angle $\theta_w$ to follow the steered angle instruction value $\theta_1^*$. By executing the angle feedback control, the first microcomputer 63 calculates a first current command value, which is a target value of current supplied to the first coil group 52. The second microcomputer 73 executes angle feedback control, which causes the actual steered angle $\theta_w$ to follow the steered angle instruction value $\theta_2^*$. By executing the angle feedback control, the second microcomputer 73 calculates a second current command value, which is a target value of current supplied to the second coil group 53. The actual steered angle $\theta_w$ can be calculated based on the rotation angles $\theta_{m1}$ and $\theta_{m2}$ of the motor 31, which are detected by the rotation angle sensors 43a and 43b.

Normally, the torque required to be generated by the motor 31 is covered equally (50%) by the torque generated by the first coil group 52 and the torque generated by the second coil group 53. Normally, the two steered angle instruction values $\theta_1^*$ and $\theta_2^*$ are basically set to the same value. When one of the two coil groups (first coil group 52 and second coil group 53) fails to work, the remaining normal coil group continues operating the motor 31. In this case, the upper ECU 200 may calculate steered angle instruction values $\theta_1^*$ and $\theta_2^*$ that are suitable for controlling the motor 31 using the remaining normal coil group. Thus, in the third embodiment, the ECU 40 has the autonomous driving function.

Modifications

The first to third embodiments may be modified as follows.

In the first to third embodiments, the temperature sensors 44a and 44b are arranged in the ECU 40. Instead, the temperature sensors 44a and 44b may be arranged in the motor 31.

In the first to third embodiments, as shown by the long dashed double-short dashed line in FIG. 3, a filter 95 may be arranged on a signal path between the subtractor 103 of the second microcomputer 73 and the adder 94 of the first microcomputer 63. Further, a filter 105 may be arranged on a signal path between the subtractor 93 of the first microcomputer 63 and the adder 104 of the second microcomputer 73. In this case, the filters 95 and 105 can limit the influence of noise or the like superimposed on the current $I_{m1}$ and the current $I_{m2}$, which are respectively detected by the current sensors 66 and 76. This allows for a more favorable sense of steering and improves NV characteristics. As another option, instead of the filters 95 and 105, multipliers that multiply the limit amounts $\delta I_2$ and $\delta I_1$ by a set gain may be used.

In the first to third embodiments, the ECU 40 includes the first controller 60 and the second controller 70, which are independent from each other. Depending on product specifications, for example, the first microcomputer 63 and the second microcomputer 73 may be constructed as a single microcomputer.

In the first to third embodiments, the maximum value of current supplied to the first coil group 52 and the maximum value of current supplied to the second coil group 53 are set to the same value, that is, the half (50%) of the maximum value (100%) of current corresponding to the maximum torque that can be generated by the motor 31. Instead, the maximum values may differ from each other (for example, 60% and 40% or 70% and 30%). The total of the maximum value of current supplied to the first coil group 52 and the maximum value of current supplied to the second coil group 53 may be within the maximum value (100%) of current corresponding to the maximum torque that can be generated by the motor 31.

In the first to third embodiments, power feeding to the two coil groups 52 and 53 are independently controlled. Instead, when the motor 31 includes three or more coil groups, power feeding to the three or more coil groups may be independently controlled. In this case, the ECU 40 may include the same number of controllers (control systems) as the number of coil groups. For example, when the motor 31 includes three coil groups (first to third coil groups), three controllers each calculate an individual current command value for the corresponding coil group of the first to third coil groups. The maximum value of each individual current command value corresponds to one-third of the maximum torque that can be generated by the motor 31.

When current supplied to any one of the three coil groups is limited, the current amount limited in that coil group (i.e., the limit amount, which is the difference from the original current amount) may be compensated equally (50%) by the remaining two coil groups. That is, current corresponding to the half of the limit amount in one coil group is supplied to the remaining two coil groups. Alternatively, when current supplied to any one of the three coil groups is limited, the limit amount, which is the current amount limited in that coil group, may be compensated only by one of the remaining two coil groups.

In a case in which the motor 31 includes four or more coil groups, an individual current command value for each coil group is calculated in the same manner as when the motor 31 includes two or more coil groups or includes three or more coil groups.

In the first to third embodiments, the EPS 10 transmits torque of the motor 31 to the steering shaft 22, more specifically, to the column shaft 22a. Instead, the EPS 10 may transmit torque of the motor 31 to the rack shaft 23.

In the first to third embodiments, the motor control device is applied to the ECU 40, which controls the motor 31 of the EPS 10. Instead, the motor control device may be applied to a controller of a motor used for another device other than the EPS 10.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A motor control device that controls a motor including coil groups, the motor control device comprising processing circuitry, wherein
the processing circuitry is configured to:
calculate a current command value corresponding to torque that should be generated by the motor;
divide the calculated current command value into individual current command values for the coil groups;
control power feeding to the coil groups independently for each of the coil groups based on a corresponding one of the individual current command values;
set, for each one of the coil groups, an upper limit value of a corresponding one of the individual current command values; and
in response to the individual current command value for a first coil group of the coil groups being limited by a limit amount to a value that is smaller than a corresponding one of the upper limit values, increase the individual current command value for at least a second coil group of the coil groups by the limit amount.

2. The motor control device according to claim 1, wherein the processing circuitry is configured such that (a) the individual current command values for the coil groups are unevenly divided, and (b) in response to the individual current command value for the first coil group being limited by the limit amount to the value that is smaller than the corresponding one of the upper limit values, the processing circuitry increases the individual current command value for at least the second coil group of the coil groups by the limit amount.

3. The motor control device according to claim 1, wherein the processing circuitry is configured such that (a) the individual current command values for the coil groups are evenly divided, and (b) in response to the individual current command value for the first coil group being limited by the limit amount to the value that is smaller than the corresponding one of the upper limit values, the processing circuitry increases the individual current command value for at least the second coil group of the coil groups by the limit amount.

4. The motor control device according to claim 1, wherein the processing circuitry is configured to:
calculate the limit amount for each of the coil groups, the limit amount being a difference between (i) the individual current command value prior to being limited for each of the coil groups and (ii) an actual value of current supplied to each of the coil groups; and
add the limit amount calculated for each of the coil groups having a limit amount greater than zero to the individual current command value of at least another one of the coil groups.

5. The motor control device according to claim 1, wherein the upper limit values of the individual current command values for the coil groups are each set to a value that is obtained by equally dividing, by the number of the coil groups, the current command value corresponding to a maximum torque that can be generated by the motor.

6. The motor control device according to claim 1, wherein the processing circuitry includes the same number of individual controllers as the number of the coil groups, the individual controllers being configured to control power feeding to the coil groups independently for each of the coil groups.

7. The motor control device according to claim 1, wherein
the motor is configured to generate torque given to a steering mechanism for a vehicle, and
the processing circuitry is configured to calculate the current command value based on a steering torque.

8. A motor control method for controlling a motor including coil groups, the motor control method comprising:
calculating a current command value corresponding to torque that should be generated by the motor;
dividing the calculated current command value into individual current command values for the coil groups;
controlling power feeding to the coil groups independently for each of the coil groups based on a corresponding one of the individual current command values;
setting, for each one of the coil groups, an upper limit value of a corresponding one of the individual current command values; and
in response to the individual current command value for a first coil group of the coil groups being limited by a limit amount to a value that is smaller than a corresponding one of the upper limit values, increasing the individual current command value for at least a second coil group of the coil groups by the limit amount.

* * * * *